US 8,585,780 B2

(12) United States Patent
Araya Hernandez et al.

(10) Patent No.: US 8,585,780 B2
(45) Date of Patent: Nov. 19, 2013

(54) DYES AND BLENDS FOR SHADING DURING LAUNDRY

(71) Applicant: BASF SE, Ludwigshafen (DE)

(72) Inventors: Carmen Araya Hernandez, Basel (CH); Frank Bachmann, Freiburg (DE); Hans Kramer, Frick (CH); Wolfgang Schlenker, Aesch (CH); Deepak M. Rane, Maharashtra Mumbai (IN)

(73) Assignee: BASF SE, Ludwigshafen (DE)

( * ) Notice: Subject to any disclaimer, the term of this patent is extended or adjusted under 35 U.S.C. 154(b) by 0 days.

(21) Appl. No.: 13/892,415

(22) Filed: May 13, 2013

(65) Prior Publication Data

US 2013/0247309 A1    Sep. 26, 2013

Related U.S. Application Data

(63) Continuation of application No. 13/695,623, filed as application No. PCT/EP2011/056456 on Apr. 21, 2011.

(60) Provisional application No. 61/332,216, filed on May 7, 2010.

(30) Foreign Application Priority Data

May 7, 2010   (EP) ..................................... 10162286

(51) Int. Cl.
*D06P 5/17*    (2006.01)
*C11D 3/34*   (2006.01)

(52) U.S. Cl.
USPC ................ 8/442; 8/587; 8/588; 8/589; 8/592; 510/301

(58) Field of Classification Search
USPC ............... 8/442, 587, 588, 589, 592; 510/301
See application file for complete search history.

(56) References Cited

U.S. PATENT DOCUMENTS 3,762,859 A      10/1973    Wixon et al.
2006/0205624 A1*   9/2006    Hohener ....................... 510/301

FOREIGN PATENT DOCUMENTS

WO       2005/014769 A1    2/2005

OTHER PUBLICATIONS

STIC Search Report dated Jul. 24, 2013.*
Allan et al., Institute of Organic Chemistry & Biochemistry, vol. 26, Jan. 1, 1961 pp. 1002-1007.
Yamada et al., Journal of the Chemical Society of Japan, Chemical Society of Japan, No. 3, Jan. 1, 1974, pp. 563-568.

* cited by examiner

*Primary Examiner* — Eisa Elhilo
(74) *Attorney, Agent, or Firm* — Shiela A. Loggins

(57) ABSTRACT

The present invention relates to a laundry shading process with specific blue or violet bisazo-dyes alone or in combination with a photocatalyst. Further aspects of the invention are a composition comprising at least one photocatalyst and at least one of the specific bisazo-dyes. The composition is particularly useful for shading textiles during laundry. Further aspects of the invention are a detergent composition, a fabric softener composition containing these dyes or mixtures of these dyes and photocatalysts and novel blue or violet bisazo-dyes.

15 Claims, No Drawings

DYES AND BLENDS FOR SHADING DURING LAUNDRY

This application is a continuation of U.S. application Ser. No. 13/695,623, filed Nov. 1, 2012, which is a national stage of PCT/EP2011/056456, filed Apr. 21, 2011, the contents of both herein incorporated entirely by reference.

DESCRIPTION

The present invention relates to a laundry shading process with specific blue or violet bis-azo-dyes alone or in combination with a photo catalyst. Further aspects of the invention are a composition comprising at least one photo catalyst and at least one of the specific bis-azo-dyes. The composition is particularly useful for shading textiles during laundry. Further aspects of the invention are a detergent composition, a fabric softener composition containing mixtures of these dyes and photo catalysts and novel blue or violet bis-azo-dyes.

A frequently employed method in bleaching and whitening is to use violet or blue dyes concurrently in order to improve the bleaching and whitening effect. If such a dye is used in conjunction with a fluorescent whitening agent, this can serve two different purposes. On the one hand, it is possible to try to achieve an increase in the degree of whiteness by compensating for the yellow of the fabric, in which case the white shade produced by the fluorescent whitening agent on the fabric is largely retained. On the other hand, the object can be to effect with the dye in question a change in the shade of the white effect produced by the fluorescent whitening agent on the fabric, in which case too an attempt is made additionally to achieve an increase in the degree of whiteness. It is thus possible to adjust the desired shade of the white effect.

An objective of the present invention is to provide particularly suitable bis-azo-dyes for a laundry shading process which can be used alone or in mixture with at least one photo catalyst. These dyes and dye mixtures with the photo catalyst should not lead to colouration of the fabric after repeated use. In other words, the dye should not accumulate on the fabric after several washing cycles. Further requirements are that these dyes should be equally useful for untreated cotton and for pre-brightened cotton. They also should not build up on other synthetic fibres, such as polyamide.

This objective is achieved with specific bis-azo-dyes which are not stable to sun light. In a specific embodiment these dyes are used together with at least one photo catalyst. That means that the components of the mixture, when applied to the fabric are decomposed by light, in particularly by sun light. Although the dyes themselves are also somewhat decomposed by light, the effect is considerably higher when applied together with the photo catalyst.

One aspect of the invention is a shading process for textile fabrics or fibres which process comprises applying a bis-azo-dye of formulae (I), (II) or (III) to the fabric or fibre in a laundry process

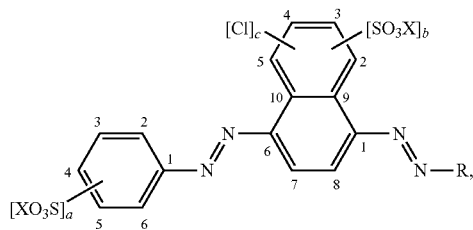

(I)

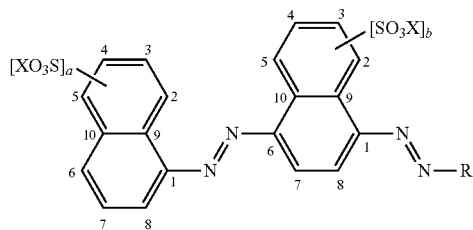

(II) or

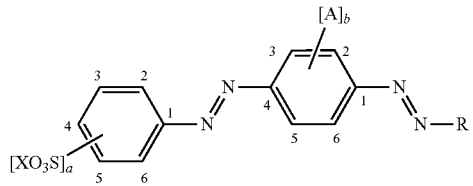

wherein
a is 0, 1 or 2;
b is 0 or 1;
c is 0 or 1;
d is 0 or 1;
A is $CH_3$ or $SO_3X$
X is H, Na or K and
R is a group

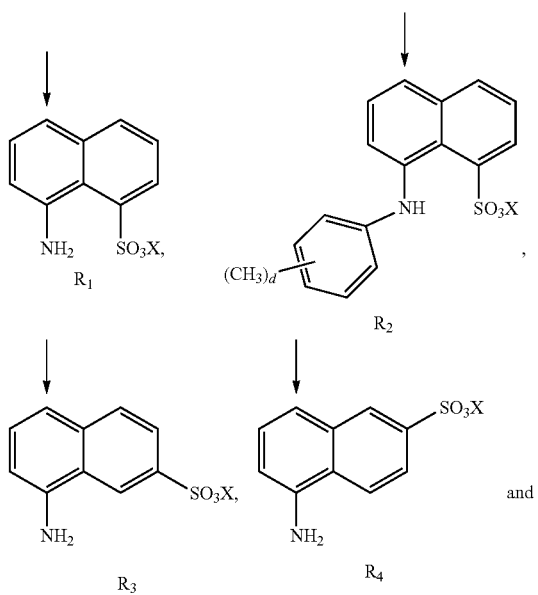

-continued

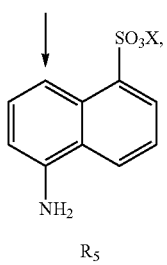

R₅ wherein the arrows indicate the points of attachment;

with the proviso that in formula (I) R is other than the group R₂ if a is 1 and b is 0.

In a specific embodiment it is a shading process for textile fabrics or fibres which process comprises applying a photo catalyst which is a water-soluble phthalocyanine of Zn, Fe(II), Ca, Mg, Na, K, Al, Si(IV), P(V), Ti(IV), Ge(IV), Cr(VI), Ga(III), Zr(IV), In(III), Sn(IV) or Hf(VI) and a bis-azo-dye of formulae (I), (II) or (III) to the fabric or fibre in a laundry process

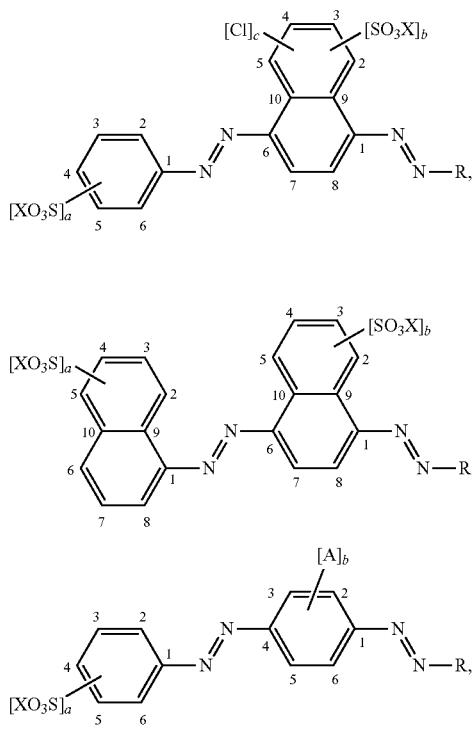

wherein
a is 0, 1 or 2;
b is 0 or 1;
c is 0 or 1;
d is 0 or 1;
A is $CH_3$ or $SO_3X$ X is H, Na or K and
R is a group

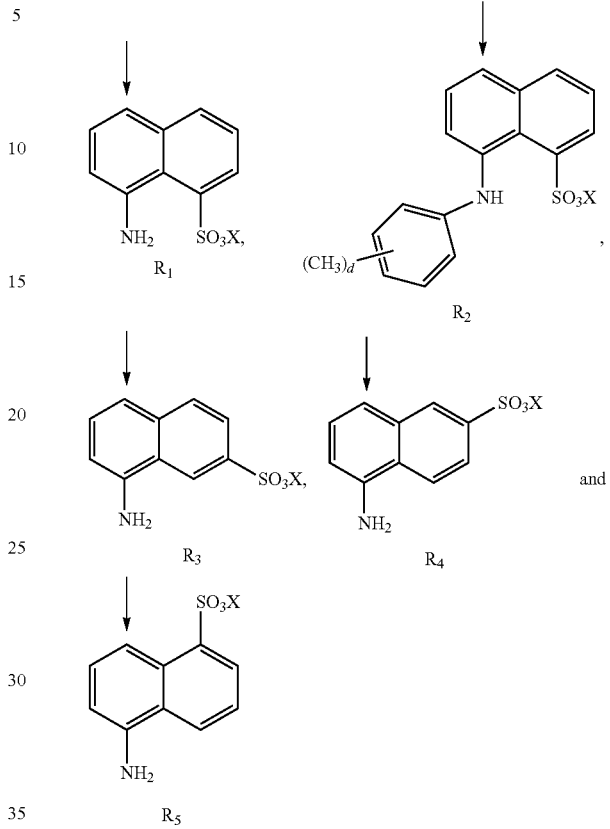

wherein the arrows indicate the points of attachment.

The weight ratio between the photo catalyst and the bis-azo-dye is from 1000:1 to 1:1000, preferably from 50:1 to 1:50 and in particular from 1:10 to 10:1.

Examples of suitable textile fibre materials which may be treated with such a composition are materials made of silk, wool, acrylics or polyurethanes, and, in particular, cellulosic fibre materials and blends of all types. Such fibre materials are, for example, natural cellulose fibres, such as cotton, linen, jute and hemp, and regenerated cellulose.

Preference is given to textile fibre materials made of cotton. Also suitable are hydroxy-containing fibres which are present in mixed fabrics, for example mixtures of cotton with polyester fibres or polyamide fibres.

In a preferred embodiment of the invention the total amount of —$SO_3X$ groups per molecule of the bis-azo-dyes is 3. This ensures an ideal balance between solubility and substantivity.

Preferably the bis-azo-dye is a compound of formulae

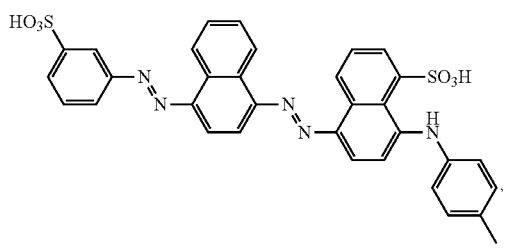

Acid Blue 120

-continued

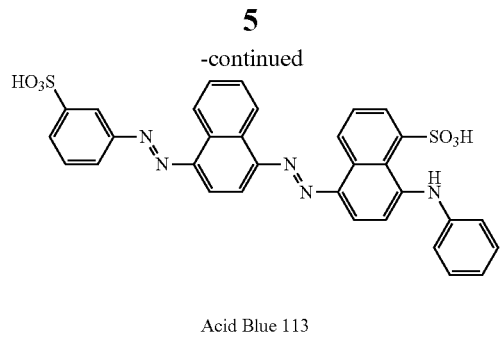

Acid Blue 113

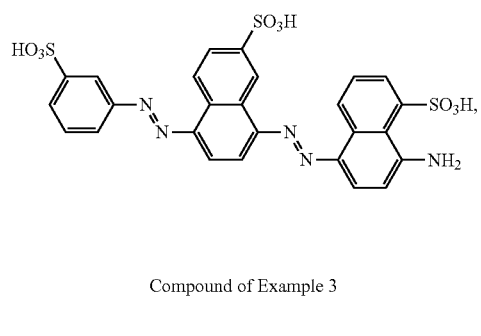

Compound of Example 3

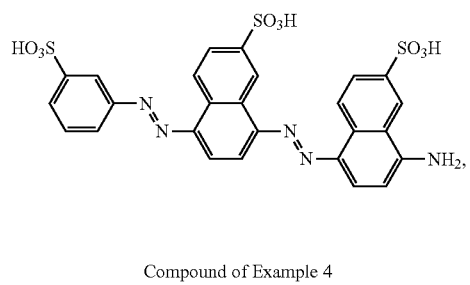

Compound of Example 4

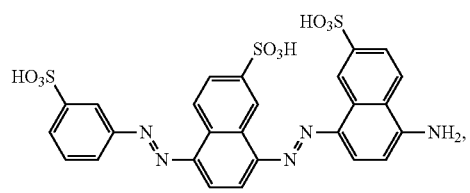

Compound of Example 16

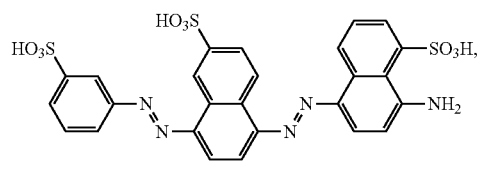

Compound of Example 20

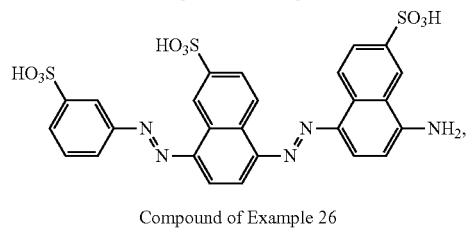

Compound of Example 26

-continued

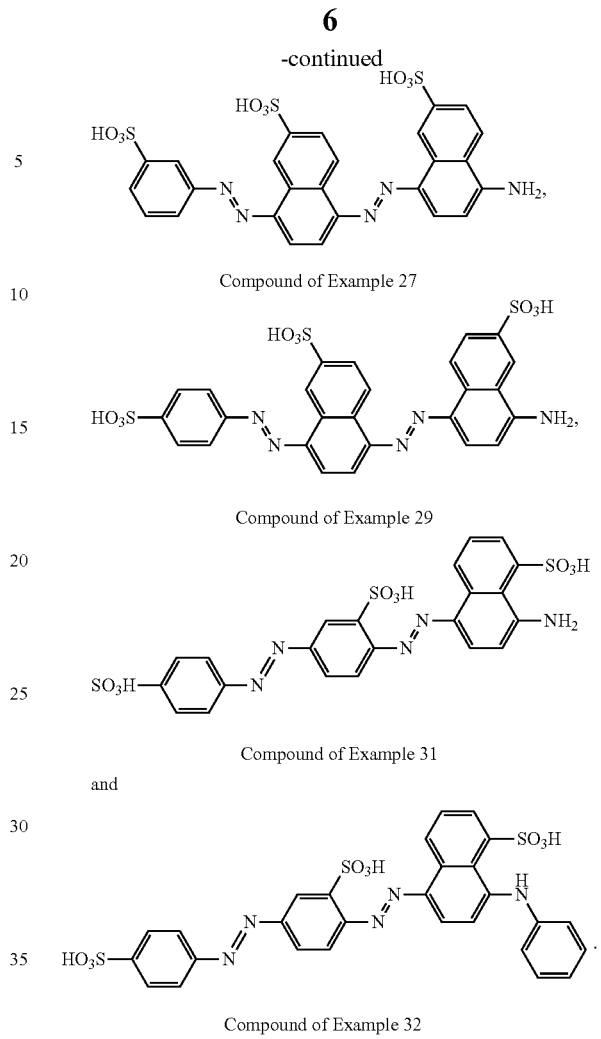

Compound of Example 27

Compound of Example 29

Compound of Example 31 and

Compound of Example 32

The sulphonic acid groups in the above formulae are given in their free acid form.

Equally embraced are the corresponding Na and K salts which may also be formed at the appropriate pH values.

Particular preference is given to the compounds of Example 3, 16, 26, 31 and 32.

Most preferred are compounds 3 and 32.

The above mentioned dyes may be used individually or in mixtures with each other. If mixtures of two are used the weight ratio between both dyes is, for example, from 1:10 to 10:1, preferably 1:1.

The composition and process comprising a water soluble phthalocyanine and a bis-azo-dye of formula (I), (II) or (III) produces a relative hue angle of 220-320° and the compounds of formula (I), (II) or (III) are not light stable, especially in the presence of the water soluble phthalocyanine. That means that the compounds of formula (I), (II), or (III) of the shading composition are decomposed by light. Visible light (400 to 800 nm) is meant by the term "light". Preferably, it is sun light.

For instance the dye component is degraded when the composition is exposed to sunlight. The degradation of the component can be determined spectrophotometrically.

Preferably the degradation of the dye in the presence of the photo catalyst mentioned above is more than 40% after 1 wash/dry cycle, under conditions as outlined in the application Examples.

In a specific embodiment of the invention the photo catalyst is a water-soluble phthalocyanine of formula (X)

$$[Me]_q-[PC]-[Q_2]_r \qquad (X)$$

in which

PC is the phthalocyanine ring system;

Me is Zn; Fe(II); Ca; Mg; Na; K; Al—$Z_1$; Si(IV); P(V); Ti(IV); Ge(IV); Cr(VI); Ga(III); Zr(IV); In(III); Sn(IV) or Hf(VI);

$Z_1$ is a halide; sulphate; nitrate; carboxylate or alkanolate ion or hydroxy;

q is 0; 1 or 2;

r is 1 to 8;

$Q_2$ is hydroxy; $C_1$-$C_{22}$alkyl; branched $C_3$-$C_{22}$alkyl; $C_2$-$C_{22}$alkenyl; branched $C_3$-$C_{22}$alkenyl and mixtures thereof; $C_1$-$C_{22}$alkoxy; a sulpho or carboxy group; a radical of the formula

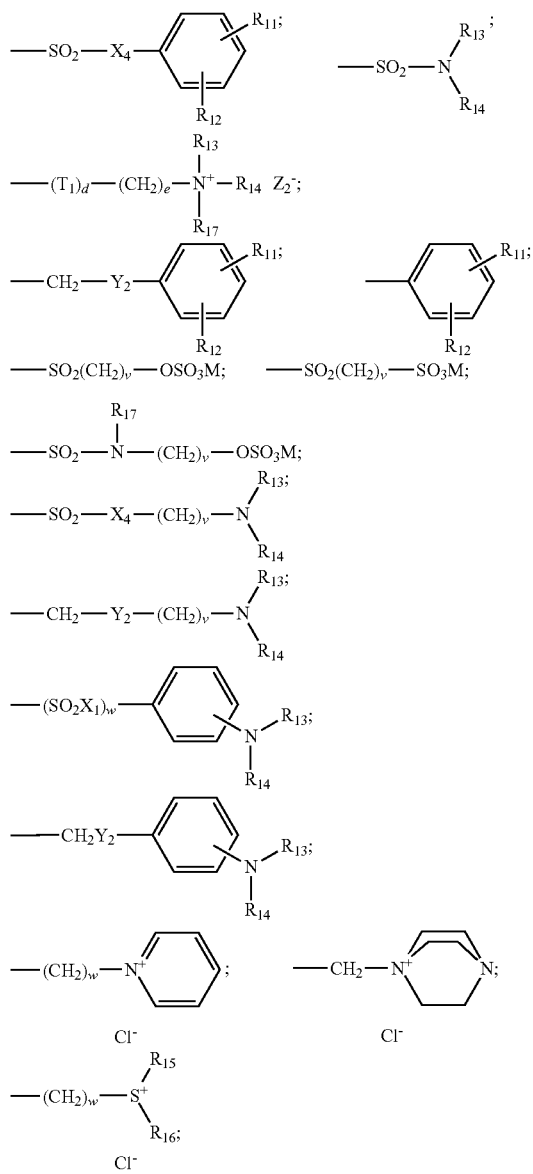

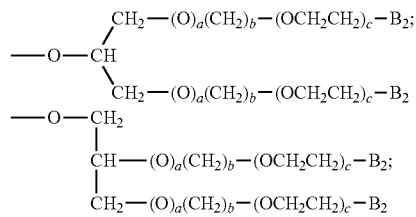

a branched alkoxy radical of the formula an alkylethyleneoxy unit of the formula -$(T_1)_d$-$(CH_2)_b$-$(OCH_2CH_2)_a$—$B_3$ or an ester of the formula COOR18 in which $B_2$ is hydrogen; hydroxy; $C_1$-$C_{30}$alkyl; $C_1$-$C_{30}$alkoxy; —$CO_2H$; —$CH_2COOH$; —$SO_3^-M_1$; —$OSO_3^-M_1$; —$PO_3^{2-}M_1$; —$OPO_3^{2-}M_1$; and mixtures thereof;

$B_3$ is hydrogen; hydroxy; —COOH; —$SO_3^-M_1$; —$OSO_3^-M_1$ or $C_1$-$C_6$alkoxy;

$M_1$ is a water-soluble cation;

$T_1$ is —O—; or —NH—;

$X_1$ and $X_4$ independently of one another are —O—; —NH— or —N—$C_1$-$C_5$alkyl;

$R_{11}$ and $R_{12}$ independently of one another are hydrogen; a sulpho group and salts thereof; a carboxy group and salts thereof or a hydroxy group; at least one of the radicals $R_{11}$ and $R_{12}$ being a sulpho or carboxy group or salts thereof;

$Y_2$ is —O—; —S—; —NH— or —N—$C_1$-$C_5$alkyl;

$R_{13}$ and $R_{14}$ independently of one another are hydrogen; $C_1$-$C_6$alkyl; hydroxy-$C_1$-$C_6$alkyl; cyano-$C_1$-$C_6$alkyl; sulpho-$C_1$-$C_6$alkyl; carboxy or halogen-$C_1$-$C_6$alkyl; un-substituted phenyl or phenyl substituted by halogen, $C_1$-$C_4$alkyl or $C_1$-$C_4$alkoxy; sulpho or carboxy or $R_{13}$ and $R_{14}$ together with the nitrogen atom to which they are bonded form a saturated 5- or 6-membered heterocyclic ring which may additionally also contain a nitrogen or oxygen atom as a ring member;

$R_{15}$ and $R_{16}$ independently of one another are $C_1$-$C_6$alkyl or aryl-$C_1$-$C_6$alkyl radicals;

$R_{17}$ is hydrogen; unsubstituted $C_1$-$C_6$alkyl or $C_1$-$C_6$alkyl substituted by halogen, hydroxy, cyano, phenyl, carboxy, carb-$C_1$-$C_6$alkoxy or $C_1$-$C_6$alkoxy;

$R_{18}$ is $C_1$-$C_{22}$alkyl; branched $C_3$-$C_{22}$alkyl; $C_1$-$C_{22}$alkenyl or branched $C_3$-$C_{22}$alkenyl; $C_3$-$C_{22}$glycol; $C_1$-$C_{22}$alkoxy; branched $C_3$-$C_{22}$alkoxy; and mixtures thereof;

M is hydrogen; or an alkali metal ion or ammonium ion, $Z_2^-$ is a chlorine; bromine; alkylsulphate or aralkylsulphate ion;

a is 0 or 1;

b is from 0 to 6;

c is from 0 to 100;

d is 0; or 1;

e is from 0 to 22;

v is an integer from 2 to 12;

w is 0 or 1; and and where the phthalocyanine ring system may also comprise further solubilising groups.

The number of substituents $Q_2$ in the formula (X) is between 1 and 8, preferably between 1 and 4, and it is not imperative, as is generally the case with phthalocyanines, for it to be an integer (degree of substitution). If other non-cationic substituents are present, the sum of the latter and the cationic substituents is between 1 and 4. The minimum number of substituents which must be present in the molecule is governed by the solubility of the resulting molecule in water. It is sufficiently soluble in water when enough of the phthalocyanine compound dissolves to effect a photodynamically catalysed oxidation on the fibre. A solubility as low as 0.01 mg/l may suffice, although one of from 0.001 to 1 g/l is generally advantageous.

Halogen means fluorine, bromine or, in particular, chlorine.

In all of these substituents, phenyl, naphthyl and aromatic hetero rings may be substituted by one or two further radicals, for example by $C_1$-$C_6$alkyl, $C_1$-$C_6$alkoxy, halogen, carboxy, carb-$C_1$-$C_6$alkoxy, hydroxy, amino, cyano, sulpho, sulphonamido, etc.

Preference is given to a substituent from the group $C_1$-$C_6$alkyl, $C_1$-$C_6$alkoxy, halogen, carboxy, carb-$C_1$-$C_6$alkoxy or hydroxy.

All of the aforementioned nitrogen heterocycles can also be substituted by alkyl groups, either on a carbon atom or on another nitrogen atom in the ring. The alkyl group is preferably the methyl group.

$C_1$-$C_6$alkyl and $C_1$-$C_6$alkoxy are straight-chain or branched alkyl or alkoxy radicals, such as, for example, methyl, ethyl, n-propyl, isopropyl, n-butyl, sec-butyl, tert-butyl, amyl, isoamyl, tert-amyl or hexyl or methoxy, ethoxy, n-propoxy, isopropoxy, n-butoxy, secbutoxy, tert-butoxy, amyloxy, isoamyloxy, tert-amyloxy or hexyloxy.

$C_2$-$C_{22}$alkenyl is, for example, allyl, methallyl, isopropenyl, 2-butenyl, 3-butenyl, isobutenyl, n-penta-2,4-dienyl, 3-methyl-but-2-enyl, n-oct-2-enyl, n-dodec-2-enyl, isododecenyl, n-dodec-2-enyl or n-octadec-4-enyl.

Other photobleaching agents which can be used according to the invention have the formula

  (XI)

in which
PC is the phthalocyanine ring system;
Me is Zn; Fe(II); Ca; Mg; Na; K; Al—$Z_1$; Si(IV); P(V); Ti(IV); Ge(IV); Cr(VI); Ga(III); $Z_1$(IV); In(III); Sn(IV) or Hf(VI);
$Z_1$ is a halide; sulphate; nitrate; carboxylate or alkanolate ion; or hydroxy;
q is 0; 1; or 2;
$Y_3'$ is hydrogen; an alkali metal ion or ammonium ion; and
r is any number from 1 to 4.

Very particularly preferred phthalocyanine compounds have the formula (4a),

  (XII)

in which
Me is Zn or Al—$Z_1$;
$Z_1$ is a halide; sulphate; nitrate; carboxylate or alkanolate; or hydroxy;
PC is the phthalocyanine ring system,
q is 0; 1; or 2;
$Y_3'$ is hydrogen; an alkali metal ion or ammonium ion; and
r is any number from 1 to 4.

Other interesting phthalocyanine compounds which can be used according to the invention have the formula

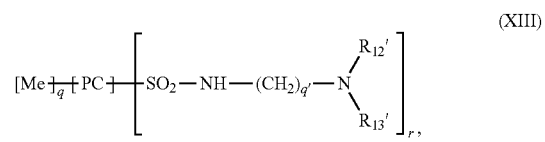  (XIII)

in which
PC, Me and q are as defined in formula (XI);
$R_{12}'$ and $R_{13}'$ independently of one another are hydrogen; phenyl; sulphophenyl; carboxyphenyl; $C_1$-$C_6$alkyl; hydroxy-$C_1$-$C_6$alkyl; cyano-$C_1$-$C_6$alkyl; sulpho-$C_1$-$C_6$alkyl; carboxy-$C_1$-$C_6$alkyl or halogen-$C_1$-$C_6$alkyl or $R_{12}'$ and $R_{13}'$ together with the nitrogen atom form the morpholine ring;
q' is an integer from 2 to 6; and
r is a number from 1 to 4;
where, if r is >1, the radicals

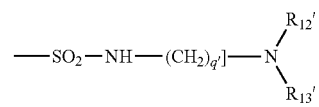

present in the molecule may be identical or different.

Further interesting phthalocyanine compounds which can be used according to the invention, have the formula

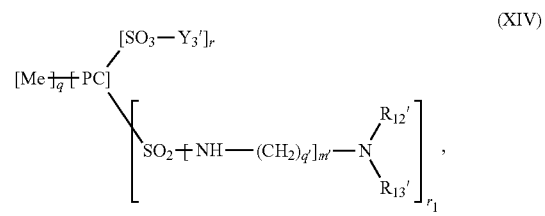  (XIV)

in which
PC, Me and q are as defined in formula (XI),
$Y_3'$ is hydrogen; an alkali metal ion or ammonium ion,
q' is an integer from 2 to 6;
$R_{12}'$ and $R_{13}'$ independently of one another are hydrogen; phenyl; sulphophenyl; carboxyphenyl; $C_1$-$C_6$alkyl; hydroxy-$C_1$-$C_6$alkyl; cyano-$C_1$-$C_6$alkyl; sulpho-$C_1$-$C_6$alkyl; carboxy-$C_1$-$C_6$alkyl or halogen-$C_1$-$C_6$alkyl or $R_{12}'$ and $R_{13}'$ together with the nitrogen atom form the morpholine ring;
m' is 0 or 1; and
r and $r_1$ independently of one another are any number from 0.5 to 3, the sum r+$r_1$ being at least 1, but no more than 4.

Especially preferred phthalocyanine compounds are such compounds which are commercially available and used in washing agent compositions. Usually, the anionic phthalocyanine compounds are in the form of alkali metal salts, especially sodium salts.

Of particular interest are the following compounds

Compound 101

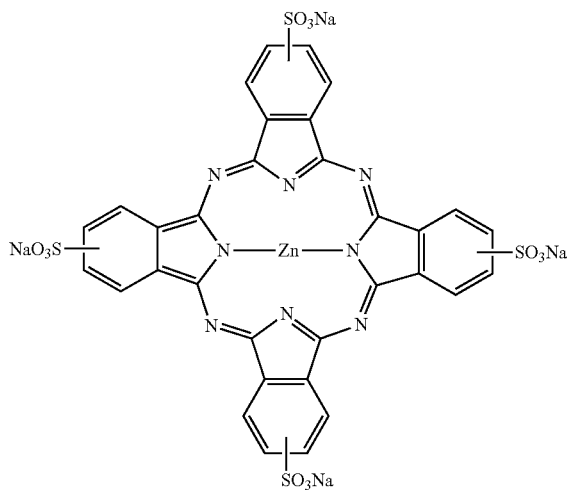

Compound 102

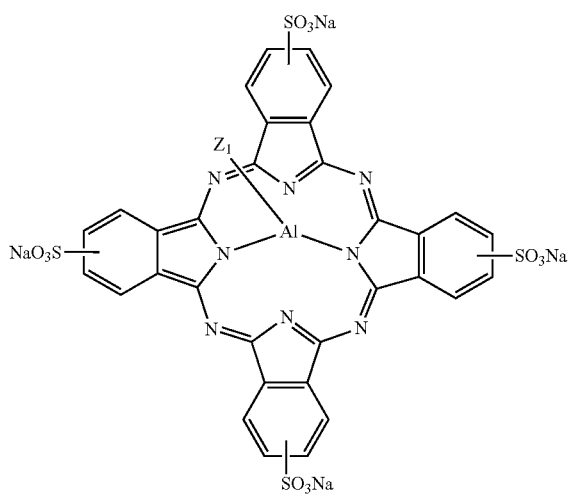

wherein there are 2-4 sulphonate groups present and $Z_1$ is a halide, sulphate, nitrate, carboxylate or alkanolate or hydroxy, preferably Cl⁻. The compounds may be individually present or as mixture in virtually any ratio.

In the formulae of compounds 101 and 102 four sulphonate groups are depicted. However, less than 4 sulphonate groups may also be present. In general a mixture containing 2 to 4 sulphonate groups will be present.

In another specific embodiment there are 2-3 sulphonate groups present and in a second specific embodiment there are 3-4 sulphonate groups present. Depending on the desired use, the one or the other embodiment may be advantageous.

In a specific embodiment at least one fluorescent whitening agent is comprised within the composition.

The fluorescent whitening agents (optical brighteners) may be selected from a wide range of chemical types such as 4,4'-bis-(triazinylamino)-stilbene-2,2'-disulphonic acids, 4,4'-bis-(triazol-2-yl)stilbene-2,2'-disulphonic acids, 4,4'-(diphenyl)-stilbenes, 4,4'-distyryl-biphenyls, 4-phenyl-4'-benzoxazolyl-stilbenes, stilbenzyl-naphthotriazoles, 4-styryl-stilbenes, bis-(benzoxazol-2-yl) derivatives, bis-(benzimidazol-2-yl) derivatives, pyrazolines, coumarines, naphthalimides, triazinyl-pyrenes, 2-styryl-benzoxazole- or naphthoxazole derivatives, benzimidazole-benzofuran derivatives or oxanilide derivatives. These optical brighteners are known and commercially available. They are described inter alia in WO 2006/024612

Another aspect of the invention is a composition comprising a) a bis-azo-dye of formulae (I), (II) or (III)

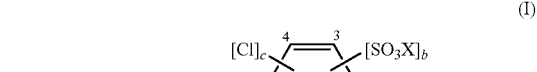

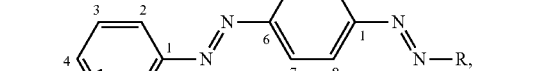

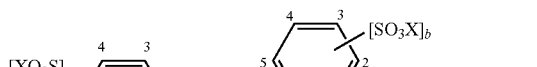

wherein
a is 0, 1 or 2;
b is 0 or 1;
c is 0 or 1;
d is 0 or 1;
A is $CH_3$ or $SO_3X$
X is H, Na or K and
R is a group

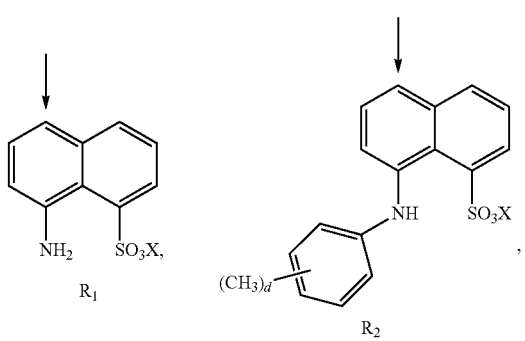

-continued

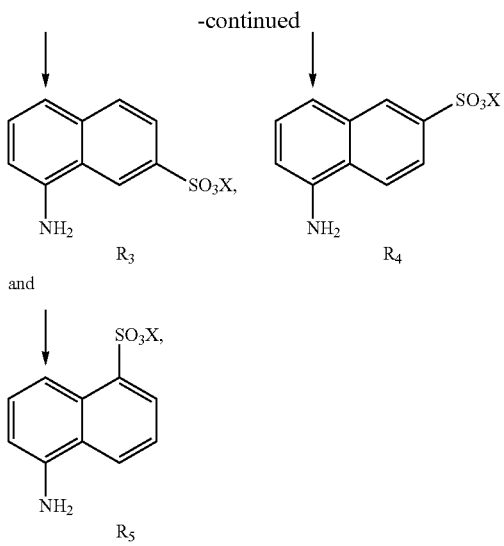

wherein the arrows indicate the points of attachment, and
b) a water-soluble phthalocyanine of Zn, Fe(II), Ca, Mg, Na, K, Al, Si(IV), P(V), Ti(IV), Ge(IV), Cr(VI), Ga(III), Zr(IV), In(III), Sn(IV) or Hf(VI).

The composition, which comprises at least one photo catalyst and at least one bis-azo-dye can be used in solid or liquid washing formulations.

Granulates are preferred as solid formulation.

Preferred is a granular formulation comprising
a) From 2 to 75 wt-% of a composition as defined above, based on the total weight of the granulate,
b) From 10 to 95 wt-% of at least one further additive, based on the total weight of the granulate, and
c) From 0 to 15 wt-% water, based on the total weight of the granulate.

The granulates are prepared according to known methods. Any known method is suitable to produce granules comprising the inventive mixture. Continuous or discontinuous methods are suitable, Continuous methods, such as spray drying or fluidised bed granulation processes are preferred.

The granulates according to the invention can be encapsulated or not.

Encapsulating materials include especially water-soluble and water-dispersible polymers and waxes. Of those materials, preference is given to polyethylene glycols, polyamides, polyacrylamides, polyvinyl alcohols, polyvinylpyrrolidones, gelatin, hydrolysed polyvinyl acetates, copolymers of vinylpyrrolidone and vinyl acetate, and also polyacrylates, paraffins, fatty acids, copolymers of ethyl acrylate with methacrylate and methacrylic acid, and polymethacrylates.

The granulates according to the invention contain from 2 to 75 wt-%, preferably from 2 to 60 wt-%, especially from 5 to 55 wt-%, of component a), based on the total weight of the granulate.

The granulates in the formulations according to the invention preferably have an average particle size of <500 μm. Greater preference is given to the particle size of the granulates being from 40 to 400 μm.

The granulates in the formulations according to the invention contain from 10 to 95 wt-%, preferably from 10 to 85 wt-%, especially from 10 to 80 wt-%, of at least one further additive (component c)), based on the total weight of the granulate.

Such further additives may be anionic or non-ionic dispersing agents; water-soluble organic polymers; inorganic salt; low-molecular-weight organic acid or a salt thereof; wetting agents; disintegrants, such as, for example, powdered or fibrous cellulose, microcrystalline cellulose; fillers such as, for example, dextrin; water-insoluble or watersoluble dyes or pigments; and also dissolution accelerators and optical brighteners.

Aluminium silicates such as zeolites, and also compounds such as talc, kaolin, $TiO_2$, $SiO_2$ or magnesium trisilicate may also be used in small amounts.

The anionic dispersing agents used are, for example, the commercially available watersoluble anionic dispersing agents for dyes, pigments etc.

The following products, especially, come into consideration: condensation products of aromatic sulphonic acids and formaldehyde, condensation products of aromatic sulphonic acids with unsubstituted or chlorinated biphenyls or biphenyl oxides and optionally formaldehyde, (mono-/di-)alkylnaphthalenesulphonates, sodium salts of polymerised organic sulphonic acids, sodium salts of polymerised alkylnaphthalenesulphonic acids, sodium salts of polymerised alkylbenzenesulphonic acids, alkylarylsulphonates, sodium salts of alkyl polyglycol ether sulphates, polyalkylated polynuclear arylsulphonates, methylene-linked condensation products of arylsulphonic acids and hydroxyarylsulphonic acids, sodium salts of dialkylsulphosuccinic acids, sodium salts of alkyl diglycol ether sulphates, sodium salts of polynaphthalenemethanesulphonates, ligno- or oxylignosulphonates or heterocyclic polysulphonic acids.

Especially suitable anionic dispersing agents are condensation products of naphthalenesulphonic acids with formaldehyde, sodium salts of polymerised organic sulphonic acids, (mono-/di-)alkylnaphthalenesulphonates, polyalkylated polynuclear arylsulphonates, sodium salts of polymerised alkylbenzenesulphonic acid, lignosulphonates, oxylignosulphonates and condensation products of naphthalenesulphonic acid with a polychloromethylbiphenyl.

Suitable non-ionic dispersants are especially compounds having a melting point of, preferably, at least 35° C. that are emulsifiable, dispersible or soluble, for example the following compounds:

1. Fatty alcohols having from 8 to 22 C-atoms, especially cetyl alcohol;
2. Addition products of, preferably, from 2 to 80 mol of alkylene oxide, especially ethylene oxide, wherein some of the ethylene oxide units may have been replaced by substituted epoxides, such as styrene oxide and/or propylene oxide, with higher unsaturated or saturated monoalcohols, fatty acids, fatty amines or fatty amides having from 8 to 22 C-atoms or with benzyl alcohols, phenyl phenols, benzyl phenols or alkyl phenols, the alkyl radicals of which have at least 4 C-atoms;
3. Alkylene oxide, especially propylene oxide, condensation products (block polymers);
4. Ethylene oxide/propylene oxide adducts with diamines, especially ethylenediamine;
5. Reaction products of a fatty acid having from 8 to 22 C-atoms and a primary or secondary amine having at least one hydroxy-lower alkyl or lower alkoxy-lower alkyl group, or alkylene oxide addition products of such hydroxyalkyl-group-containing reaction products;
6. Sorbitan esters, preferably with long-chain ester groups, or ethoxylated sorbitan esters, such as polyoxyethylene sorbitan monolaurate having from 4 to 10 ethylene oxide units or polyoxyethylene sorbitan trioleate having from 4 to 20 ethylene oxide units;

7. Addition products of propylene oxide with a tri- to hexahydric aliphatic alcohol having from 3 to 6 C-atoms, e.g. glycerol or pentaerythritol; and
8. Fatty alcohol polyglycol mixed ethers, especially addition products of from 3 to 30 mol of ethylene oxide and from 3 to 30 mol of propylene oxide with aliphatic monoalcohols having from 8 to 22 C-atoms.

Instead of or in addition to the dispersing agent or agents, the granulates according to the invention may comprise a water-soluble organic polymer, which may also have dispersing properties. Such polymers may be used singly or as mixtures of two or more polymers. As water-soluble polymers (which may, but need not, have film-forming properties), there come into consideration, for example, gelatins, polyacrylates, polymethacrylates, copolymers of ethyl acrylate, methyl methacrylate and methacrylic acid (ammonium salt), polyvinylpyrrolidones, vinylpyrrolidones, vinyl acetates, copolymers of vinylpyrrolidone with long-chain olefins, poly(vinylpyrrolidone/dimethylaminoethyl methacrylates), copolymers of vinylpyrrolidone/dimethylaminopropyl methacrylamides, copolymers of vinylpyrrolidone/dimethylaminopropyl acrylamides, quaternised copolymers of vinylpyrrolidones and dimethylaminoethyl methacrylates, terpolymers of vinylcaprolactam/vinylpyrrolidone/dimethylaminoethyl methacrylates, copolymers of vinylpyrrolidone and methacrylamidopropyltrimethylammonium chloride, terpolymers of caprolactam/vinylpyrrolidone/dimethylaminoethyl methacrylates, copolymers of styrene and acrylic acid, polycarboxyic acids, polyacrylamides, carboxymethyl cellulose, hydroxymethyl cellulose, polyvinyl alcohols, hydrolysed and non-hydrolysed polyvinyl acetate, copolymers of maleic acid with unsaturated hydrocarbons and also mixed polymerisation products of the mentioned polymers. Further suitable substances are polyethylene glycol (MW: 2000-20 000), copolymers of ethylene oxide with propylene oxide (MW>3500), condensation products (block polymerisation products) of alkylene oxide, especially propylene oxide, copolymers of vinylpyrrolidone with vinyl acetate, ethylene oxidepropylene oxide addition products with diamines, especially ethylenediamine, polystyrenesulphonic acid, polyethylenesulphonic acid, copolymers of acrylic acid with sulphonated styrenes, gum arabic, hydroxypropyl methylcellulose, sodium carboxymethyl cellulose, hydroxypropyl methylcellulose phthalate, maltodextrin, starch, sucrose, lactose, enzymatically modified and subsequently hydrated sugars, as are obtainable under the name "Isomalt", cane sugar, polyaspartic acid and tragacanth.

Among those water-soluble organic polymers, special preference is given to carboxymethyl cellulose, polyacrylamides, polyvinyl alcohols, polyvinylpyrrolidones, gelatins, hydrolysed polyvinyl acetates, copolymers of vinylpyrrolidone and vinyl acetate, maltodextrins, polyaspartic acid and also polyacrylates and polymethacrylates.

For use as inorganic salts there come into consideration carbonates, hydrogen carbonates, phosphates, polyphosphates, sulphates, silicates, sulphites, borates, halides and pyrophosphates, preferably in the form of alkali metal salts. Preference is given to water-soluble salts such as, for example, alkali metal chlorides, alkali phosphates, alkali carbonates, alkali polyphosphates and alkali sulphates and water-soluble salts used in washing agent and/or washing agent additive formulations.

Also suitable is a liquid formulation comprising a composition as defined above.

Preferred is a liquid formulation comprising
(a) 0.01-95 wt-%, preferably 1-80 wt-%, more preferably 5-70 wt-% of a composition comprising at least one water-soluble phthalocyanine compound and at least one bis-azo-dye as defined above, based on the total weight of the liquid formulation,
(b) 5-99.99 wt-%, preferably 20-99 wt-%, more preferably 30-95 wt-%, based on the total weight of the liquid formulation, of at least one organic solvent and/or water and
(c) 0-10 wt-%, preferably 0-5 wt-%, more preferably 0-2 wt-%, based on the total weight of the liquid formulation, of at least one further additive.

Also an aspect of the invention is a liquid or solid detergent formulation in which the composition as described above is homogeneously distributed.

Another aspect of the invention is a detergent formulation comprising
I) From 5 to 70 wt-% A) of at least one anionic surfactant and/or B) at least one non-ionic surfactant, based on the total weight of the washing agent formulation,
II) From 5 to 60 wt-% C) of at least one builder substance, based on the total weight of the washing agent formulation,
III) From 0 to 30 wt-% D) of at least one peroxide and, optionally, at least one activator, based on the total weight of the washing agent formulation, and
IV) From 0.001 to 1 wt-% E) of at least one granulate which contains
  a) From 2 to 75 wt-% of a composition as defined above, based on the total weight of the granulate,
  b) From 10 to 95 wt-% of at least one further additive, based on the total weight of the granulate, and
  c) From 0 to 15 wt-% water, based on the total weight of the granulate.
V) From 0 to 60 wt-% F) of at least one further additive, and
VI) From 0 to 5 wt-% G) water.

The sum of the wt-% of components I)-VI) in a formulation is always 100%.

The percentages of components I) to VI) in the washing agent formulations herein below are in all cases based on the total weight of the washing agent formulation.

Examples for components A) and B) have already been given above.

As builder substance C) there come into consideration, for example, alkali metal phosphates, especially tripolyphosphates, carbonates or hydrogen carbonates, especially their sodium salts, silicates, aluminosilicates, polycarboxylates, polycarboxylc acids, organic phosphonates, aminoalkylenepoly(alkylenephosphonates) or mixtures of those compounds.

Suitable peroxide components D) include, for example, the organic and inorganic per-oxides (like sodium percarbonate or sodium perborate) known in the literature and available commercially that bleach textile materials at conventional washing temperatures, for example from 5 to 95° C.

The amount of the peroxide or the peroxide-forming substance is preferably 0.5-30% by weight, more preferably 1-20% by weight and especially preferably 1-15% by weight.

It is, however, also possible that no peroxide or peroxide forming substance is present.

The detergents used will usually contain one or more auxiliaries such as soil suspending agents, for example sodium carboxymethylcellulose; salts for adjusting the pH, for example alkali or alkaline earth metal silicates; foam regulators, for example soap; salts for adjusting the spray drying and granulating properties, for example sodium sulphate; perfumes; and also, if appropriate, antistatic and softening agents; such as smectite clays; photobleaching agents; pigments; and/or shading agents. These constituents should, of course, be stable to any bleaching system employed. Such auxiliaries can be present in an amount of, for example, 0.1 to 20 wt-%, preferably 0.5 to 10 wt-%, especially 0.5 to 5.0 wt-%, based on the total weight of the detergent.

Furthermore, the detergent can optionally contain enzymes. Enzymes can be added to detergents for stain removal. The enzymes usually improve the performance on stains that are either protein- or starch-based, such as those caused by blood, milk, grass or fruit juices. Preferred enzymes are cellulases, proteases, amylases and lipases. Preferred enzymes are cellulases and proteases, especially proteases. Cellulases are enzymes which act on cellulose and its derivatives and hydrolyze them into glucose, cellobiose, cellooligosaccharide. Cellulases remove dirt and have the effect of mitigating the roughness to the touch. Examples of enzymes to be used include, but are by no means limited to, the following:

Proteases as mentioned in U.S. Pat. No. 6,242,405, column 14, lines 21 to 32;

lipases as mentioned in U.S. Pat. No. 6,242,405, column 14, lines 33 to 46; amylases, loc. cit., column 14, lines 47 to 56; and cellulases, loc. cit., column 14, lines 57 to 64.

The enzymes can optionally be present in the detergent. When used, the enzymes are usually present in an amount of 0.01-5.0 wt-%, preferably 0.05-5.0 wt-% and more preferably 0.1-4.0 wt-%, based on the total weight of the detergent.

In addition to the bleach catalyst according to formula (1) it is also possible to use further transition metal salts or complexes known as bleach-activating active ingredients and/or conventional bleach activators, that is to say compounds that, under perhydrolysis conditions, yield unsubstituted or substituted perbenzo- and/or peroxo-carboxylc acids having from 1 to 10 C-atoms, especially from 2 to 4 C-atoms. Suitable bleach activators include the customary bleach activators, mentioned at the beginning, that carry O- and/or N-acyl groups having the indicated number of C-atoms and/or unsubstituted or substituted benzoyl groups. Preference is given to polyacylated alkylenediamines, especially tetraacetylethylenediamine (TAED), acylated glycolurils, especially tetraacetylglycoluril (TAGU), N,N-diacetyl-N,N-dimethylurea (DDU), acylated triazine derivatives, especially 1,5-diacetyl-2,4-dioxohexahydro-1,3,5-triazine (DADHT), compounds of formula:

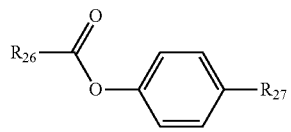

wherein $R_{26}$ is a sulphonate group, a carboxylc acid group or a carboxylate group, and wherein $R_{27}$ is linear or branched $(C_7$-$C_{15})$alkyl, especially activators known under the names SNOBS, SLOBS and DOBA, acylated polyhydric alcohols, especially triacetin, ethylene glycol diacetate and 2,5-diacetoxy-2,5-dihydrofuran, and also acetylated sorbitol and mannitol and acylated sugar derivatives, especially pentaacetylglucose (PAG), sucrose polyacetate (SUPA), pentaacetylfructose, tetraacetylxylose and octaacetyllactose as well as acetylated, optionally N-alkylated glucamine and gluconolactone. It is also possible to use the combinations of conventional bleach activators known from German Patent Application DE-A-44 43 177 Nitrile compounds that form perimine acids with peroxides also come into consideration as bleach activators.

Also an aspect of the invention is a softener composition comprising (a) A composition as defined above, and
(b) A fabric softener.

Fabric softeners, especially hydrocarbon fabric softeners, suitable for use herein are selected from the following classes of compounds:

Cationic quaternary ammonium salts. The counter ion of such cationic quaternary ammonium salts may be a halide, such as chloride or bromide, methyl sulphate, or other ions well known in the literature. Preferably the counter ion is methyl sulphate or any alkyl sulphate or any halide, methyl sulphate being most preferred for the dryer-added articles of the invention.

These softeners are more definitively described in U.S. Pat. No. 4,134,838 the disclosure of which is incorporated by reference herein. Preferred fabric softeners for use herein are acyclic quaternary ammonium salts. Mixtures of the above mentioned fabric softeners may also be used.

The fabric softener formulation according to this invention comprises about 0.001-5.0 wt-%, preferably 0.001-3.0 wt-%, of the above composition.

The shading composition according to the invention is used especially in a washing or softener formulation. Such a washing or softener formulation may be in solid, liquid, gel-like or paste-like form, for example in the form of a liquid, non-aqueous washing agent composition containing not more than 5.0 wt-%, preferably from 0 to 1 wt-%, water and based on a suspension of a builder substance in a non-ionic surfactant, for example as described in GB-A-2 158454.

The washing formulations may also be in the form of powders or (super-) compact powders, in the form of single- or multi-layer tablets (tabs), in the form of washing agent bars, washing agent blocks, washing agent sheets, washing agent pastes or washing agent gels, or in the form of powders, pastes, gels or liquids used in capsules or in pouches (sachets).

Further aspects of the invention are the use of a bis-azo-dye as defined above and the use of a composition as defined above for improving the whiteness of textile materials.

A further aspect of the invention are novel bis-azo-dyes compounds selected from the group consisting of the following Examples

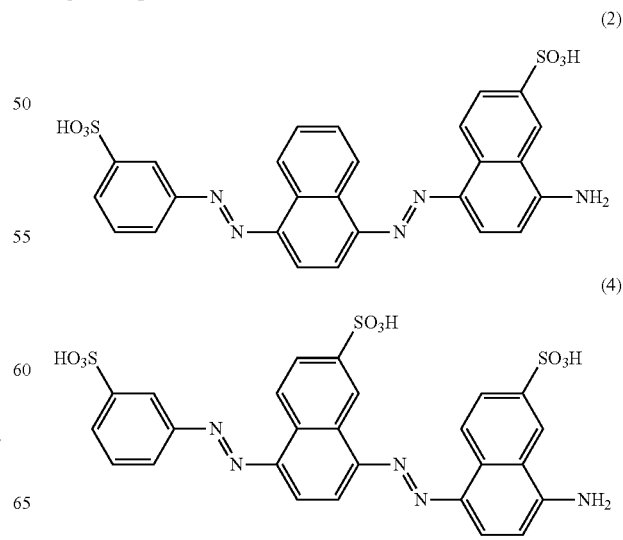

-continued
(5)
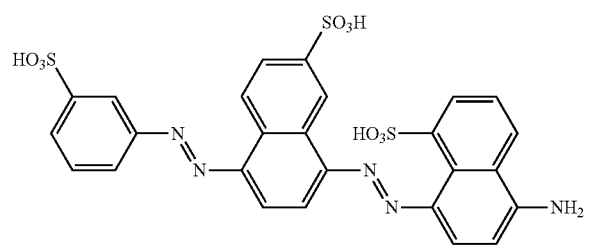
(6)
(7)
(9)
(10)
(11)
-continued
(12)
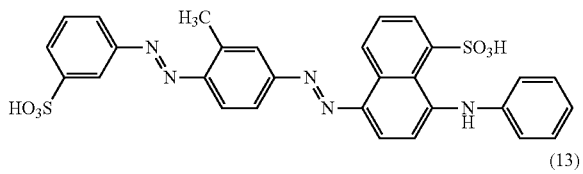
(13)
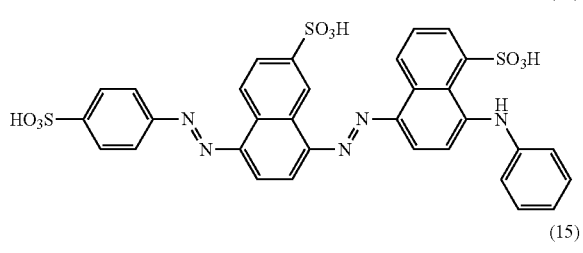
(15)
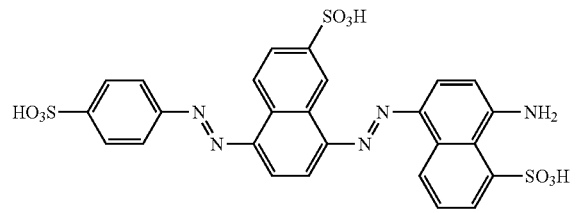
(16)
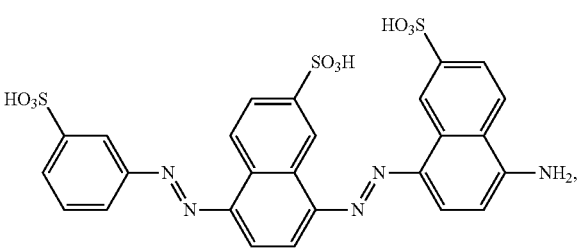
(18)
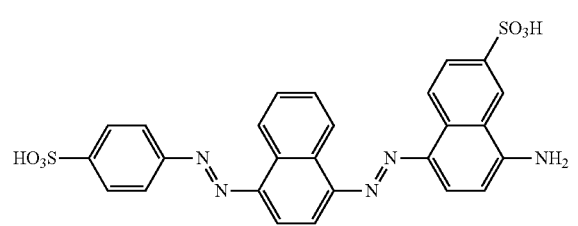
(20)
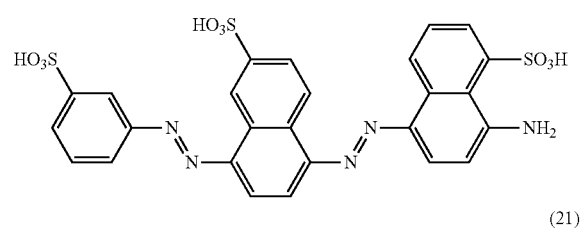
(21)
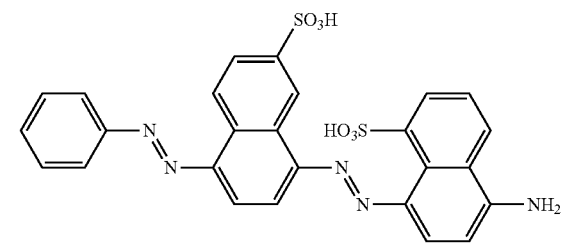

(22)
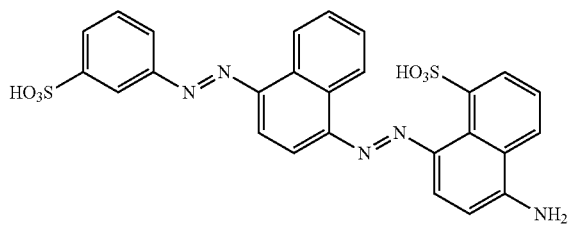

(23)
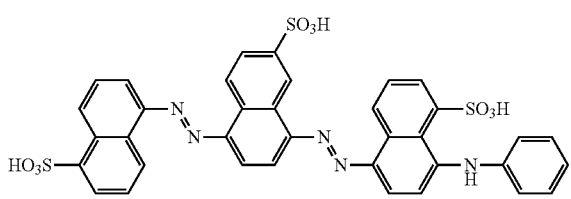

(24)
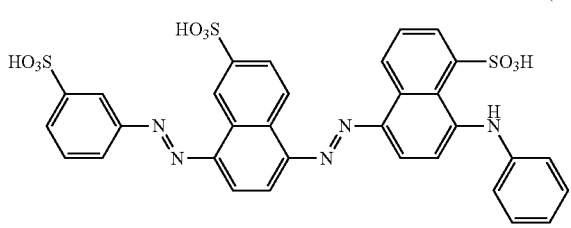

(26)
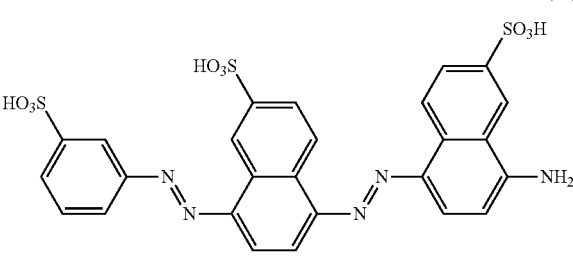

(27)
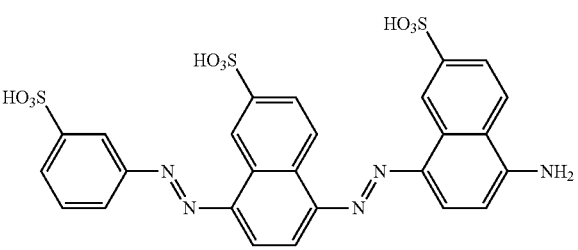

(28)
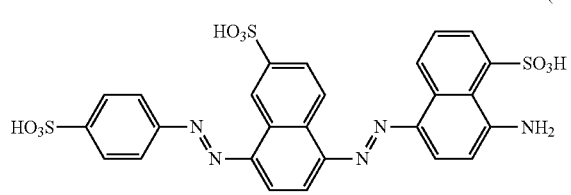

(29)
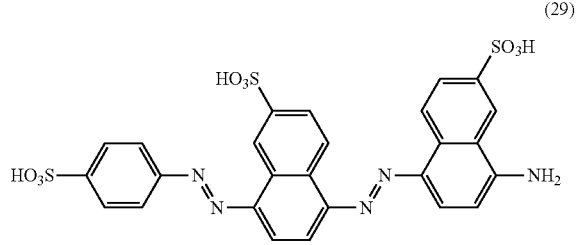 [SMILES: Nc1ccc(/N=N/c2ccc(/N=N/c3ccc(S(=O)(=O)O)cc3)c3cc(S(=O)(=O)O)ccc23)c2cc(S(=O)(=O)O)ccc12]

(30)
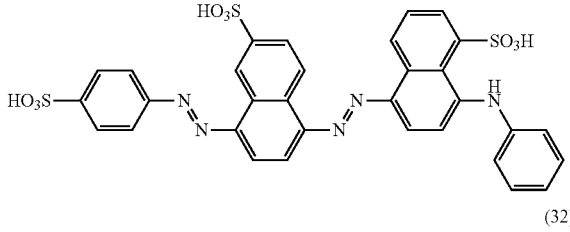

(32)
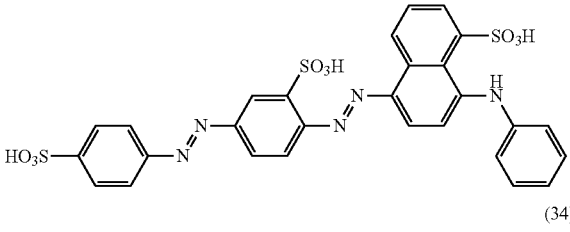

(34)
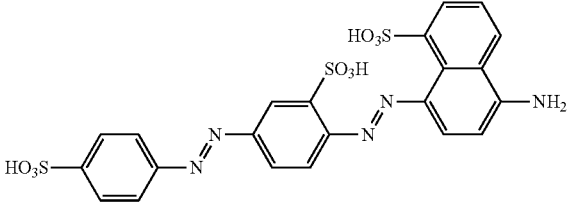

and

(36)
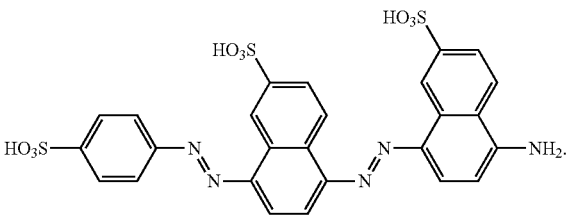

All definitions and preferences given above apply equally for all aspects of the invention.

The following Examples illustrate the invention.

A. PREPARATION EXAMPLES

The syntheses of the prepared bis-azo-dyes consist of two azo-coupling steps. First a suitable amino compound is diazotized and coupled with a suitable aromatic amino compound to give the mono-azo intermediate. In a second step, this mono-azo compound is diazotized and coupled with an aromatic amino compound. The final bis-azo-dye is isolated

Example 1

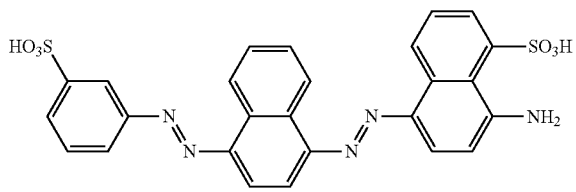 [SMILES: Nc1ccc(/N=N/c2ccc(/N=N/c3cccc(S(=O)(=O)O)c3)c3ccccc23)c2cccc(S(=O)(=O)O)c12]

The compound is obtained according to literature [N. Sekar, G. Chakko, Rajule, R. N. Colourage (2005) 52 82), 119].

$UV_{vis}(H_2O)$ $\lambda_{max}$: 555 nm, purity (98% at 254 nm) determined by HPLC-area %. The isolated yield of black coloured dye is 53%.

Example 2

General Procedure for the Synthesis of Bis-Azo-Dyes
a) Synthesis of Mono-Azo Intermediate

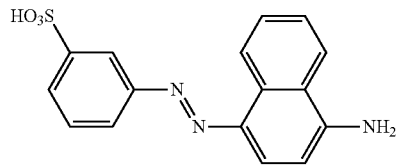

17.3 g (0.1 mol) aniline-3-sulphonic acid is dissolved in a mixture of 150 ml water and 4 g (0.1 mol) of solid sodium hydroxide. To this solution, 6.9 g (0.1 mol) of solid sodium nitrite dissolved in 15 ml water is added. Under stirring, the resulting mixture is cooled to 5° C. and diazotized by dropwise addition of 70 ml of 50% aqueous HCl-solution over 15 min. The reaction mixture is stirred at 2-7° C. for 90 min. A slight excess of nitrous acid is decomposed by adding 10% aqueous solution sulphamic acid (10 ml) and stirring is continued for 30 min. The diazonium salt suspension is added at 10° C. to a solution containing 14.3 g (0.1 mol) of 1-naphthylamine in 100 ml of water and 4.0 g (0.1 mol) of solid NaOH over 15 min. The pH of the solution is maintained at 3-4 by addition of 10% aqueous NaOH-solution. After stirring at 10° C. for 2 h, reaction is allowed to stir for 12 hours at room temperature. The precipitated solid is separated by filtration. The crude product is suspended in 50 ml MeOH for one hour and the resulted suspension is filtered. The dark brown coloured solid product is dried in an heating oven at 55-60° C.

Characterization of the product is done on the basis of $UV_{vis}$ spectroscopy and purity is confirmed by HPLC-area %. HPLC is done on a reversed phase Inertsil® ODS-2 column, GL Sciences Inc. Binary gradient elution is performed as follows: Mobile phase 'A' is 0.2% tetra-butyl ammonium bromide in water, mobile phase 'B' is 100% MeOH (HPLC-grade) Initially A: B is maintained at 80:20, and by step gradient, mobile phase 'B' is increased to 100% in 30 minutes.

18 g of 94% (measured at a wavelength of 254 nm) pure mono-azo compound with molecular formula $C_{16}H_{13}N_3O_3S$ is isolated in 56% yield.

b) Preparation of Bis-Azo-Dye

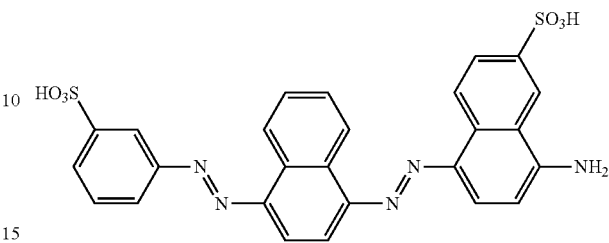

In a mixture of 20 ml water and 0.3 g (7.6 mmol) of solid NaOH, 2.5 g (7.6 mmol) of the mono-azo compound prepared in Example 1a) is dissolved. To this stirred solution, a solution of 0.52 g (7.6 mmol) of solid $NaNO_2$ in 2 ml water is added. The reaction mixture is cooled to 5° C. and 5 ml 50% aqueous HCl is added dropwise over 15 min. The reaction temperature is kept at 2-7° C. for 90 min. An excess of nitrous acid is decomposed by adding 10% aqueous solution sulphamic acid (1.5 ml) and stirring is continued for 30 min. The diazonium salt suspension is added at 10° C. to a solution of 1.69 g (7.6 mmol) of 8-amino-1-naphthalene 2-sulphonic acid (1.7-Cleve acid) in 20 ml water and 0.3 g (7.6 mmol) solid NaOH, whereby the pH is maintained between 8-9 by addition of 10% aqueous NaOH-solution. After stirring at 10° C. for 3 hours, it is heated at 70° C. for 1 h. Completion of the reaction is monitored by reverse phase TLC (RP-18 $F_{254S}$, Merck) using 1:1 mixture of water and MeOH as mobile phase (starting material $R_f$ 0.8; product $R_f$ 0.6). To the reaction mixture, 7 g (10% w/v) of NaCl is added. The reaction mixture is stirred for 8 hours at room temperature. The precipitated solid is isolated by filtration and is further treated with 25 ml of a 1:1 mixture of MeOH/water. The solid obtained after filtration is dried in a heating oven at 55-60° C. It is characterized by $UN_{vis}$ spectroscopy ($\lambda_{max}$ 526 nm, $H_2O$). The purity (92.6% at 254 nm) is confirmed by HPLC-area %. The blackish bis-azo-dye is isolated in 57% yield.

Example 3

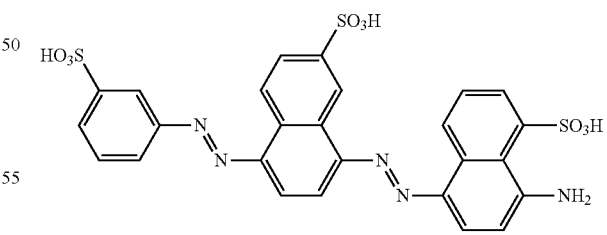

a) Preparation of mono-azo derivative 8-amino-5-(3-sulpho-phenylazo)-naphthalene-2-sulphonic acid According to the procedure described in Example 2, 17.3 g (0.1 mol) of aniline-3-sulphonic acid and 22.3 g (0.1 mol) of 8-amino-naphthalene-2-sulphonic acid are coupled to produce 8-amino-5-(3-sulpho-phenylazo)-naphthalene-2-sulphonic acid with molecular formula $C_{16}H_{13}N_3O_6S_2$. It is characterized by UV-visible spectroscopy and purity (91% at 254 nm) is determined by HPLC-area %. The isolated yield of black coloured dye is 60% b) Preparation of Bis-Azo-Dye: According to the General Procedure Described in Example 2

17.4 g (0.04 mol) of 8-amino-5-(3-sulpho-phenylazo)-naphthalene-2-sulphonic acid and 8.4 g (0.04 mol) of 8-amino-naphthalene-1-sulphonic acid (Peri acid) are reacted and worked-up.

$UV_{vis}(H_2O)$ $\lambda_{max}$: 563 nm, the purity is 91% at 254 nm determined by HPLC-area %, isolated yield of black coloured dye 52%.

Example 4

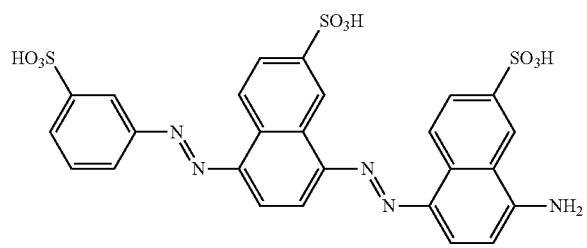 [SMILES: Nc1ccc(/N=N/c2ccc(/N=N/c3cccc(S(=O)(=O)O)c3)c3ccc(S(=O)(=O)O)cc23)c2ccc(S(=O)(=O)O)cc12]

Following the procedure described in Example 2, 3.1 g (0.0076 mol) of 8-amino-5-(3-sulphophenylazo)-naphthalene-2-sulphonic acid and 1.7 g (0.0076 mol) of 8-aminonaphthalene-2-sulphonic acid (1.7-Cleve acid) are reacted and worked-up.

$UV_{vis}(H_2O)$ $\lambda_{max}$: 535 nm, purity (85% at 254 nm) determined by HPLC-area %.

Example 5

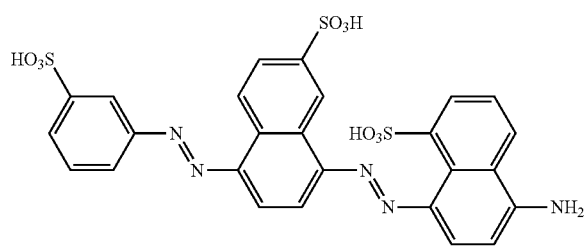 [SMILES: Nc1ccc(/N=N/c2ccc(/N=N/c3cccc(S(=O)(=O)O)c3)c3ccc(S(=O)(=O)O)cc23)c2c(S(=O)(=O)O)cccc12]

According to the general procedure described in Example 2, 3.1 g (0.0076 mol) of 8-amino-5-(3-sulphophenylazo)-naphthalene-2-sulphonic acid and 1.7 g (0.0076 mol) of 5-amino-naphthalene-1-sulphonic acid (Laurent acid) are coupled and worked-up to obtain bis-azo-dye as greenish black coloured solid.

$UV_{vis}(H_2O)$ $\lambda_{max}$: 536 nm, purity (95% at 254 nm) determined by HPLC-area %, isolated yield 10%.

Example 6

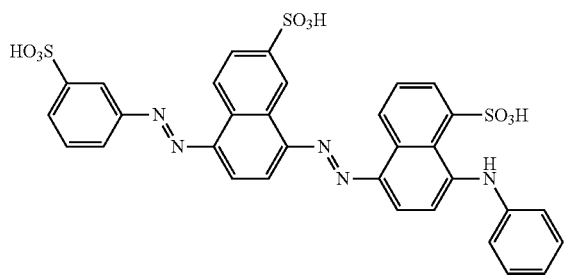 [SMILES: O=S(=O)(O)c1cccc(/N=N/c2ccc(/N=N/c3ccc(Nc4ccccc4)c4c(S(=O)(=O)O)cccc34)c3cc(S(=O)(=O)O)ccc23)c1]

Following the procedure described in Example 2, 3.1 g (0.0076 mol) of 8-amino-5-(3-sulphophenylazo)-naphthalene-2-sulphonic acid and 2.3 g (0.0076 mol) of 8-phenylamino-naphthalene-1-sulphonic acid (N-phenyl Peri acid) are reacted. The crude product is treated with 30 ml solution of 20% methanol and acetone to remove impurities. The bis-azo-dye is obtained in pure form.

$UV_{vis}(H_2O)$ $\lambda_{max}$: 576 nm, purity (89% at 254 nm) determined by HPLC-area %. The isolated yield of black coloured dye is 44%.

Example 7

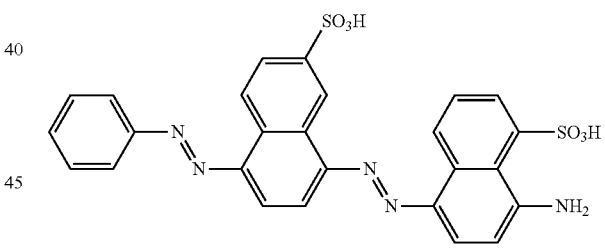

a) Preparation of mono-azo-derivative 8-amino-(5-phenylazo)-naphthalene-2-sulphonic acid 9.5 g (0.1 mol) of aniline and 22.3 g (0.1 mol) of 8-amino-naphthalene-2-sulphonic acid are treated according to the procedure described in Example 2. It is characterized by UV-visible spectroscopy; the purity (95.1% at 254 nm) is determined by HPLC-area %. The isolated yield of dark brown coloured dye is 84%.

b) Preparation of Bis-Azo-Dye

According to the procedure described in Example 2, 10 g (0.3 mol) of 8-amino-(5-phenylazo)-naphthalene-2-sulphonic acid and 6.8 g (0.3 mol) of 8-amino-naphthalene-1-sulphonic acid (Peri acid) are reacted and worked-up.

UV$_{vis}$(H$_2$O) $\lambda_{max}$: 554 nm, purity (91% at 254 nm) determined by HPLC-area %. The isolated yield of black coloured dye is 29%.

Example 8

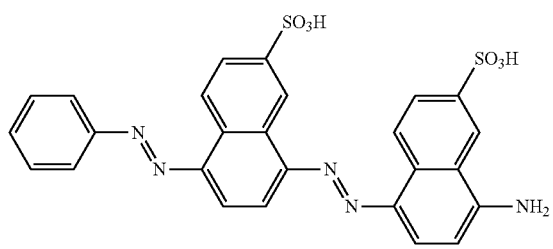 [SMILES: Nc1ccc(/N=N/c2ccc(/N=N/c3ccccc3)c3ccc(S(=O)(=O)O)cc23)c2ccc(S(=O)(=O)O)cc12]

2.5 g (0.0076 mol) of 8-amino-(5-phenylazo)-naphthalene-2-sulphonic acid and 1.7 g (0.0076 mol) of 8-amino-naphthalene-2-sulphonic acid (1.7-Cleve acid) are treated, reacted and worked-up according to the general procedure described in Example 2. UV$_{vis}$(H$_2$O) $\lambda_{max}$: 526 nm, purity (94% at 254 nm) determined by HPLC-area %. The isolated yield of black coloured dye is 5%.

Example 9

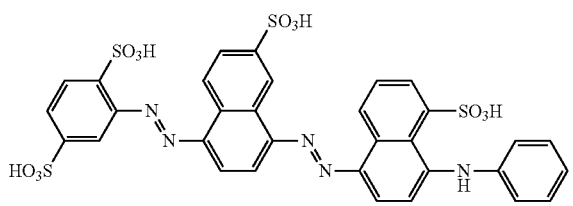 [SMILES: O=S(=O)(O)c1ccc(S(=O)(=O)O)c(/N=N/c2ccc(/N=N/c3ccc(Nc4ccccc4)c4c(S(=O)(=O)O)cccc34)c3cc(S(=O)(=O)O)ccc23)c1]

a) Preparation of mono-azo 2-(4-amino-6-sulpho-naphthalene-1-ylazo)-benzene-1,4-disulphonic acid According to the general procedure described in Example 2, 10 g (0.039 mol) of aniline-2,5-disulphonic acid and 8.9 g (0.039 mol) of 8-amino-naphthalene-2-sulphonic acid are reacted. The mono-azo intermediate is characterized by UV$_{vis}$ spectroscopy, the purity (91%) is determined by HPLC-area %. The isolated yield of black coloured dye is 47% b) Preparation of Bis-Azo-Dye

According to the general procedure described in Example 2, 3.5 g (0.0072 mol) of the mono-azo compound prepared in a) and 2.16 g (0.0072 mol) of 8-phenylamino-naphthalene-1-sulphonic acid (N-phenyl Peri acid) are reacted. After completing the reaction the mixture is heated to 70° C. for 1 h and temperature is reduced to 50° C. before adding 20% w/v salt. It is cooled to room temperature and solid precipitate is filtered off. Crude bis-azo-dye is treated with 1:1 mixture of MeOH and acetone to remove impurities. The bis-azo-dye is obtained in pure form.

UV$_{vis}$(H$_2$O) $\lambda_{max}$: 587 nm, purity (82% at 254 nm) determined by HPLC-area %. The isolated yield of black coloured dye is 30%.

Example 10

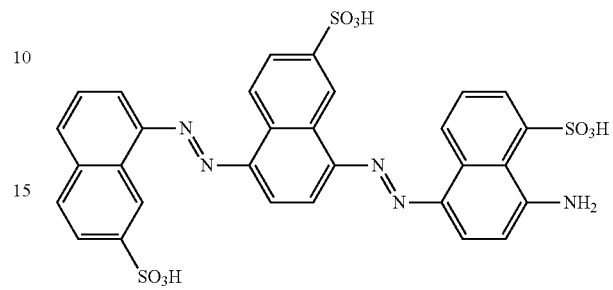

a) Preparation of Mono-Azo Derivative

First intermediate is prepared according to a literature procedure [M. Wojciechowska, G. Wojciechowska, W. Wasiak: *J. of Molecular Structure*, 658 (2003) 125-133). To a reaction mixture of 40 ml water containing 0.76 g (0.011 mol, 10% excess) of NaNO$_2$ is added 40 ml solution of 4.46 g (0.02 mol) of 8-amino-naphthalene-2-sulphonic acid and 4 ml concentrated HCl at room temperature. The pH of the reaction mixture is adjusted at 2 and it is heated for 30 min at 55° C. 24 g of sodium chloride is added to the reaction mixture and it is kept for 8 hours at room temperature. The precipitated solid is filtered off, washed with water (12 ml) and dried in oven at 50° C. Yield: 4.2 g, quantitative.

b) Preparation of Bis-Azo-Dye

According to the procedure described in Example 2, 4.57 g (0.01 mol) of mono-azo 8-amino-5,8'-azo-bis-naphthalene-2-sulphonic acid and 2.23 g (0.01 mol) of 8-amino-naphthalene-1-sulphonic acid (Peri acid) are reacted. The crude bis-azo-dye is stirred with 20 ml 1:1 mixture of methanol and water and filtrated. The filtrate is poured into 150 ml acetone. The solid is filtered off, and the filtrate is concentrated once again to remove solvent. The solid precipitated from the aqueous layer is filtered off and dried in oven at 55° C.

UV$_{vis}$(H$_2$O) $\lambda_{max}$: 568 nm, purity (98% at 254 nm) determined by HPLC-area %. The isolated yield of black coloured dye is 10%.

Example 11

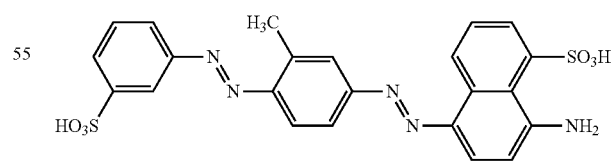

a) Preparation of 3-(4-amino-2-methyl-phenylazo)-benzenesulphonic acid

According to the general procedure given in Example 2, 8.65 g (0.05 mol) of aniline-3-sulphonic acid and 5.3 g (0.05 mol) of m-toluidene are treated, reacted and worked-up. It is characterized by UV-visible spectroscopy, and purity is determined by HPLC-area %. The isolated yield of black coloured dye is 50%.

b) Preparation of Bis-Azo-Dye

According to the general procedure 2.9 g (0.01 mol) of 3-(4-amino-2-methyl-phenylazo)-benzenesulphonic acid and 2.23 g (0.01 mol) of 8-amino-naphthalene-1-sulphonic acid (Peri acid) are coupled, a pH value of 3.0-3.5 is adjusted. After completing the reaction, the solid precipitated is filtered and treated further with 25 ml 1:1 mixture of methanol and acetone to remove impurities. The pure bis-azo-dye is obtained as greenish black solid.

$UV_{vis}(H_2O)$ $\lambda_{max}$: 541 nm, purity (85% at 254 nm) determined by HPLC-area %, isolated yield 21%.

Example 12

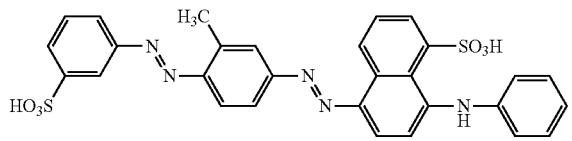 [SMILES: Cc1cc(/N=N/c2ccc(Nc3ccccc3)c3c(S(=O)(=O)O)cccc23)ccc1/N=N/c1cccc(S(=O)(=O)O)c1]

Preparation of 5-[3-methyl-4-(3-sulpho-phenylazo)-phenylazo]-8-phenylamino-naphthalene-1-sulphonic acid: According to the general procedure described in Example 2, 2.9 g (0.01 mol) of 3-(4-amino-2-methyl-phenylazo)-benzenesulphonic acid prepared in Example 11a and 3.0 g (0.01 mol) of 8-phenylamino-naphthalene-1-sulphonic acid (N-phenyl Peri acid) are reacted and worked-up.

$UV_{vis}(H_2O)$ $\lambda_{max}$: 541 nm, purity (87% at 254 nm) determined by HPLC-area %, isolated yield 32%, greenish black-coloured solid.

Example 13

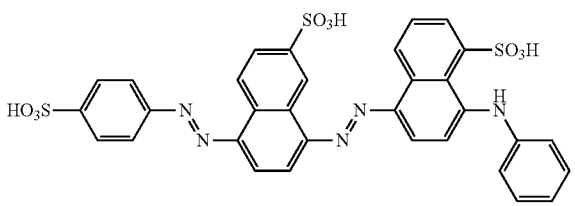 [SMILES: O=S(=O)(O)c1ccc(/N=N/c2ccc(/N=N/c3ccc(Nc4ccccc4)c4c(S(=O)(=O)O)cccc34)c3cc(S(=O)(=O)O)ccc23)cc1]

a) Preparation of mono-azo derivative 8-amino-5-(4-sulpho-phenylazo)-naphthalene-2-sulphonic acid Following the general procedure described in Example 2, 19.5 g (0.1 mol) of sodium salt of aniline-4-sulphonic acid and 22.3 g (0.1 mol) of 8-amino-naphthalene-2-sulphonic acid are treated and worked-up. It is characterized by $UV_{vis}$ spectroscopy and purity (92% at 254 nm) is determined by HPLC-area %. The isolated yield of black coloured dye is 60%.

b) Preparation of Bis-Azo-Dye

Following the general procedure described in Example 2, 4.07 g (0.01 mol) of 8-amino-5-(4-sulpho-phenylazo)-naphthalene-2-sulphonic acid and 3.0 g (0.01 mol) of 8-phenylamino-naphthalene-1-sulphonic acid (N-phenyl Peri acid) are treated and worked-up.

$UN_{vis}(H_2O)$ $\lambda_{max}$: 581 nm, purity (91% at 254 nm) determined by HPLC-area %, isolated yield 28%.

Example 14

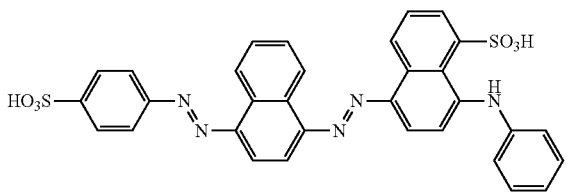 [SMILES: O=S(=O)(O)c1ccc(/N=N/c2ccc(/N=N/c3ccc(Nc4ccccc4)c4c(S(=O)(=O)O)cccc34)c3ccccc23)cc1]

a) Preparation of mono-azo derivative 4-(4-amino-naphthalene-1-ylazo)benzenesulphonic acid According to the general procedure described in Example 2, 19.5 g (0.1 mol) of aniline-4-sulphonic acid sodium salt and 14.3 g (0.1 mol) of 1-aminonaphthalene are treated and worked-up. It is characterized by UV-visible spectroscopy and purity (92% at 254 nm) is determined by HPLC-area %. The isolated yield of dark red coloured dye is 50%.

b) Preparation of Bis-Azo-Dye

According to the general procedure described in Example 2, 3.27 g (0.01 mol) of 4-(4-amino-naphthalene-1-ylazo)benzenesulphonic acid and 3.0 g (0.01 mol) of 8-phenylamino-naphthalene-1-sulphonic acid (N-phenyl Peri acid) are treated and worked-up.

$UV_{vis}(H_2O)$ $\lambda_{max}$: 569 nm, purity (97% at 254 nm) determined by HPLC-area %, isolated yield 15%, black-coloured solid.

Example 15

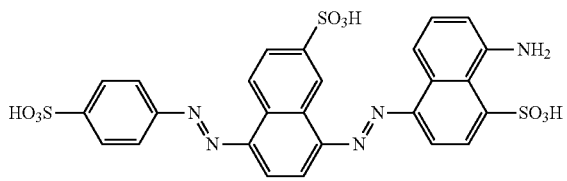 [SMILES: Nc1cccc2c(/N=N/c3ccc(/N=N/c4ccc(S(=O)(=O)O)cc4)c4ccc(S(=O)(=O)O)cc34)ccc(S(=O)(=O)O)c12]

Following the general procedure described in Example 2, 4.07 g (0.01 mol) of 8-amino-5-(4-sulpho-phenylazo)-naphthalene-2-sulphonic acid prepared in Example 13 and 2.23 g (0.01 mol) of 8-amino-naphthalene-1-sulphonic acid (Peri acid) are treated and worked-up.

UV$_{vis}$(H$_2$O) $\lambda_{max}$: 566 nm, purity (95% at 254 nm) determined by HPLC-area %, isolated yield 15%, black solid.

Example 16

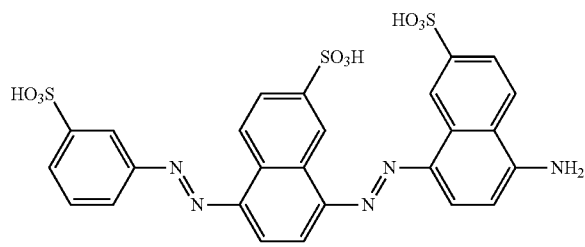 [SMILES: Nc1ccc(/N=N/c2ccc(/N=N/c3cccc(S(=O)(=O)O)c3)c3ccc(S(=O)(=O)O)cc23)c2cc(S(=O)(=O)O)ccc12]

According to the general procedure described in Example 2, 4.07 g (0.01 mol) of 8-amino-5-(3-sulphophenylazo)-naphthalene-2-sulphonic acid and 2.2 g (0.01 mol) of 8-amino-naphthalene-3-sulphonic acid (1.6-Cleve's acid) are reacted. After completing the reaction the reaction mixture is heated to 70° C. for 1 h and temperature is reduced to 50° C. before adding 20% w/v sodium chloride. A solid precipitated after cooling the reaction mixture at room temperature and is filtered off. The crude product is treated with 1:1 mixture of methanol and water to remove impurities. The bis-azo-dye is obtained in pure form as a black solid.

UV$_{vis}$(H$_2$O) $\lambda_{max}$: 532 nm, purity (88% at 254 nm) determined by HPLC-area %, isolated yield 27%, black solid.

Example 17

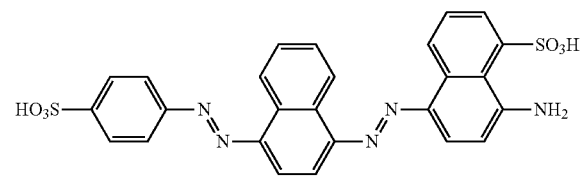 [SMILES: Nc1ccc(/N=N/c2ccc(/N=N/c3ccc(S(=O)(=O)O)cc3)c3ccccc23)c2cccc(S(=O)(=O)O)c12]

According the literature mentioned in Example 1, 3.27 g (0.01 mol) of 4-(4-amino-naphthalene-1-ylazo)benzenesulphonic acid and 2.23 g (0.01 mol) 8-amino-naphthalene-1-sulphonic acid (Peri acid) are treated, reacted and worked-up.

UV$_{vis}$(H$_2$O) $\lambda_{max}$: 560 nm, purity (98% at 254 nm) determined by HPLC-area %, isolated yield 20%, black solid.

Example 18

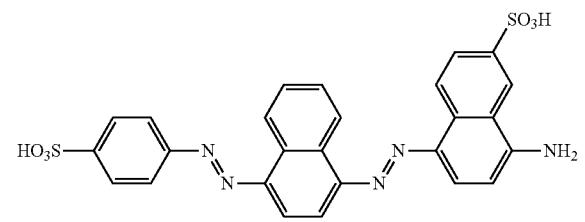 [SMILES: Nc1ccc(/N=N/c2ccc(/N=N/c3ccc(S(=O)(=O)O)cc3)c3ccccc23)c2ccc(S(=O)(=O)O)cc12]

Following the procedure described general procedure described in Example 2, 3.27 g (0.01 mol) of 4-(4-amino-naphthalene-1-ylazo)benzenesulphonic acid (described in Example 14) and 2.23 g (0.01 mol) 8-amino-naphthalene-2-sulphonic acid (1.7-Cleve acid) are treated, reacted and worked-up.

UV$_{vis}$(H$_2$O) $\lambda_{max}$: 532 nm, purity (90% at 254 nm) determined by HPLC-area %, isolated yield 25%, black solid.

Example 19

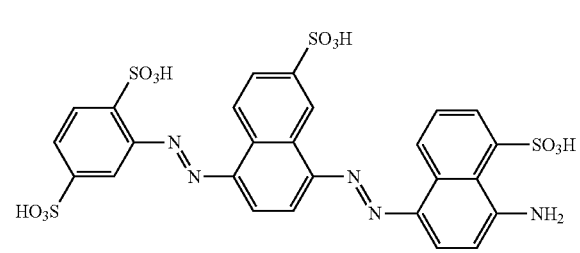 [SMILES: Nc1ccc(/N=N/c2ccc(/N=N/c3cc(S(=O)(=O)O)ccc3S(=O)(=O)O)c3ccc(S(=O)(=O)O)cc23)c2cccc(S(=O)(=O)O)c12]

According to literature [A. Ono, K. Watanabe, S. Yamate, Jpn. Kokai Tokyo Koho (2001)], 2.5 g (0.005 mol) of 2-(4-amino-6-sulpho-naphthalene-1-ylazo)-benzene-1,4-disulphonic acid and 1.11 g (0.005 mol) of 8-amino-naphthalene-1-sulphonic acid (Peri acid) are reacted. The crude dye is washed with 1:1 mixture of methanol and acetone to remove impurities.

UV$_{vis}$(H$_2$O) $\lambda_{max}$: 556 nm, purity (75% at 254 nm) determined by HPLC-area %, isolated yield 14%, black solid.

Example 20

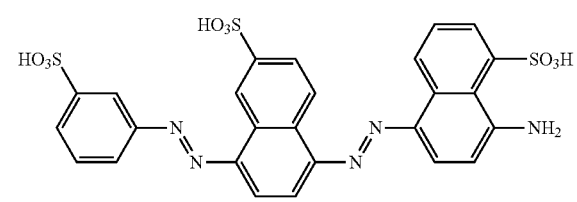 [SMILES: Nc1ccc(/N=N/c2ccc(/N=N/c3cccc(S(=O)(=O)O)c3)c3cc(S(=O)(=O)O)ccc23)c2cccc(S(=O)(=O)O)c12]

Following the general procedure described in Example 2, 4.07 g (0.01 mol) of 5-amino-8-(3-sulpho-phenylazo)-naphthalene-2-sulphonic acid and 2.23 g (0.01 mol) of 8-amino-naphthalene-1-sulphonic acid (Peri acid) are treated, reacted and worked-up.

UV$_{vis}$(H$_2$O) $\lambda_{max}$: 561 nm, purity (92% at 254 nm) determined by HPLC-area %, isolated yield 23%, black solid.

Example 21

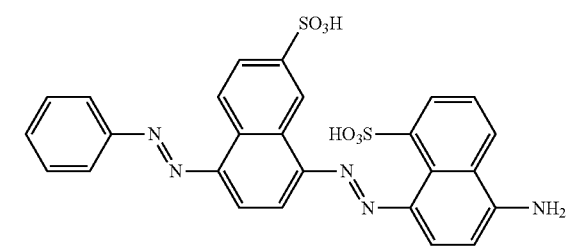 [SMILES: Nc1ccc(/N=N/c2ccc(/N=N/c3ccccc3)c3ccc(S(=O)(=O)O)cc23)c2c(S(=O)(=O)O)cccc12]

According to the general procedure described in Example 2, 2.5 g (0.0076 mol) of 8-amino-5-(phenylazo)-naphthalene- 2-sulphonic acid and 1.7 g (0.0076 mol) of 5-amino-naphthalene-1-sulphonic acid (Laurent acid) are treated, reacted and worked-up.

$UV_{vis}(H_2O)\ \lambda_{max}$: 531 nm, purity (92% at 254 nm) determined by HPLC-area %, isolated yield 26%, greenish black coloured solid.

Example 22

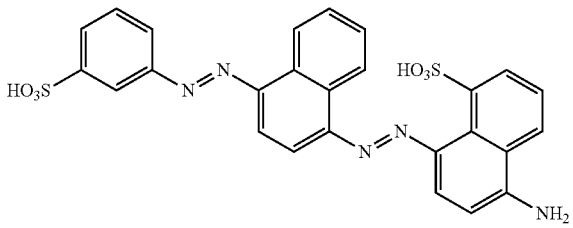 [SMILES: Nc1ccc(/N=N/c2ccc(/N=N/c3cccc(S(=O)(=O)O)c3)c3ccccc23)c2c(S(=O)(=O)O)cccc12]

According to the general procedure described in Example 2, 2.5 g (0.0076 mol) of 3-(4-amino-naphthalene-1-ylazo)-benzenesulphonic acid and 1.7 g (0.0076 mol) of 5-amino-naphthalene-1-sulphonic acid (Laurent acid) are reacted and worked-up.

$UV_{vis}(H_2O)\ \lambda_{max}$: 527 nm, purity (91% at 254 nm) determined by HPLC-area %, isolated yield 20%, black solid.

Example 23

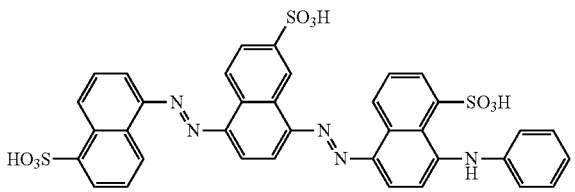

a) Preparation of mono-azo derivative 8-amino-5-(5-sulpho-naphthalene-1-ylazo)naphthalene-2-sulphonic acid Following the general procedure described in Example 2, 6.6 g (0.029 mol) of 5-amino-naphthalene-1-sulphonic acid and 6.6 g (0.029 mol) of 8-amino-naphthalene-2-sulphonic acid are reacted and worked-up. The mono-azo derivative is characterized by $UV_{vis}$ spectroscopy and purity (92% at 254 nm) is determined by HPLC-area %. The isolated yield of dark green coloured dye is 84%.

b) Preparation of bis-azo-dye

According to the general procedure described in Example 2, 3.6 g (0.0076 mol) of 8-amino-5-(5-sulpho-naphthalene-1-ylazo)-naphthalene-2-sulphonic acid and 3.0 g (0.01 mol) of 8-phenylamino-naphthalene-1-sulphonic acid (N-phenyl Peri acid) are coupled. The crude dye is washed with 1:1 mixture of methanol and acetone to remove impurities.

$UV_{vis}(H_2O)\ \lambda_{max}$: 582 nm, purity (90% at 254 nm) determined by HPLC-area %, isolated yield 12%, black-coloured solid

Example 24

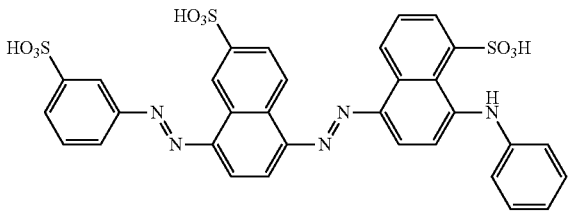 [SMILES: O=S(=O)(O)c1cccc(/N=N/c2ccc(/N=N/c3ccc(Nc4ccccc4)c4c(S(=O)(=O)O)cccc34)c3ccc(S(=O)(=O)O)cc23)c1]

a) Preparation of 5-amino-8-(3-sulpho-phenylazo)-naphthalene-2-sulphonic acid Following the general procedure described in Example 2a, 8.65 g (0.05 mol) of aniline-3-sulphonic acid and 14.3 g (0.1 mol) of 5-amino-naphthalene-2-sulphonic acid are reacted and worked-up. The product is characterized by UV-visible spectroscopy. The purity (96% at 254 nm) is determined by HPLC-area %. The isolated yield of blackish green coloured dye is 98%.

b) Preparation of Bis-Azo-Dye

Following the procedure described in Example 2b, 4.07 g (0.01 mol) of 5-amino-8-(3-sulpho-phenylazo)-naphthalene-2-sulphonic acid and 3.0 g (0.01 mol) of 8-phenylamino-naphthalene-1-sulphonic acid (N-phenyl Peri acid) are treated, reacted and worked-up.

UV$_{vis}$(H$_2$O) λ$_{max}$: 577 nm, purity (99% at 254 nm) determined by HPLC-area %, isolated yield 26%, black solid.

UV$_{vis}$(H$_2$O) λ$_{max}$: 536 nm, purity (94% at 254 nm) determined by HPLC-area %, isolated yield 78%, black solid.

Example 25

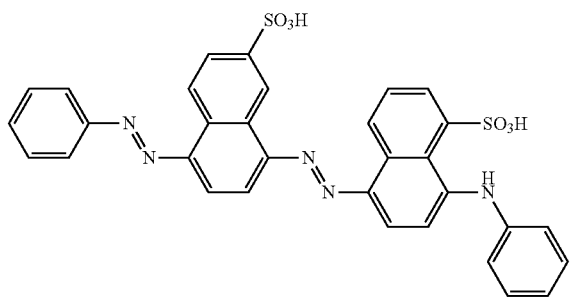 [SMILES: O=S(=O)(O)c1ccc2c(/N=N/c3ccccc3)ccc(/N=N/c3ccc(Nc4ccccc4)c4c(S(=O)(=O)O)cccc34)c2c1]

The bis-azo-dye is prepared according to known procedures (i.e. S. Batchelor, J. Bird, WO2009087032].

UV$_{vis}$(H$_2$O) λ$_{max}$: 577 nm, purity (98.8% at 254 nm) determined by HPLC-area %, isolated yield 26%, black solid.

Example 27

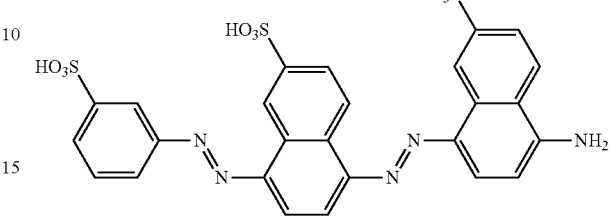

Following the general procedure described in Example 2, 4.07 g (0.01 mol) of 5-amino-8-(3-sulpho-phenylazo)-naphthalene-2-sulphonic acid and 2.23 g (0.01 mol) of 5-amino-naphthalene-2-sulphonic acid (1.6-Cleve acid) are reacted and worked-up.

UN$_{vis}$(H$_2$O) λ$_{max}$: 536 nm, purity (89% at 254 nm) determined by HPLC-area %, isolated yield 7%, black solid.

Example 28

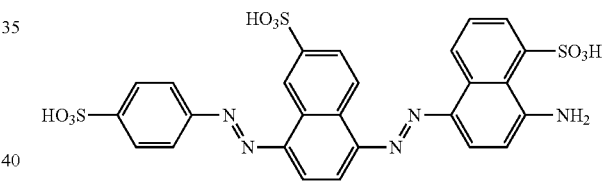

Example 26

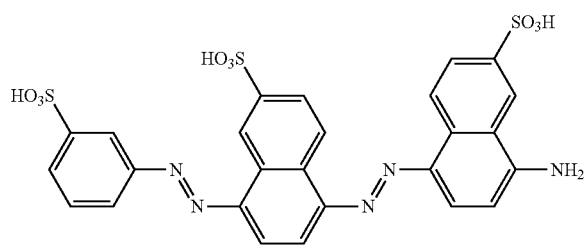 [SMILES: Nc1ccc(/N=N/c2ccc(/N=N/c3cccc(S(=O)(=O)O)c3)c3cc(S(=O)(=O)O)ccc23)c2ccc(S(=O)(=O)O)cc12]

Following the general procedure described in Example 2, 4.07 g (0.01 mol) of 5-amino-8-(3-sulpho-phenylazo)-naphthalene-2-sulphonic acid and 2.23 g (0.01 mol) of 8-amino-naphthalene-2-sulphonic acid (1.7-Cleve acid) are reacted and worked-up.

a) Preparation of mono-azo derivative 5-amino-8-(4-sulpho-phenylazo)-naphthalene-2-sulphonic acid Following the general procedure described in Example 2a, 8.65 g (0.05 mol) of aniline-4-sulphonic acid and 11.2 g (0.05 mmol) of 5-amino-naphthalene-2-sulphonic acid are reacted and worked-up. It is characterized by UV$_{vis}$ spectroscopy and purity (97% at 254 nm) is determined by HPLC-area %. The isolated yield of dark green coloured dye is 85%.

b) Preparation of bis-azo-dye

Following the procedure described in Example 2b, 4.07 g (0.01 mol) of mono-azo derivative 5-amino-8-(4-sulpho-phenylazo)-naphthalene-2-sulphonic acid and 2.23 g (0.01 mol) of 8-amino-naphthalene-1-sulphonic acid (Peri acid) are reacted and worked-up.

UN$_{vis}$(H$_2$O) $\lambda_{max}$: 566 nm, purity (98% at 254 nm) determined by HPLC-area %, isolated yield 17%, black solid.

Example 29

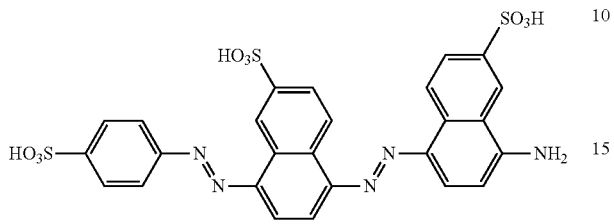

According to the general procedure described in Example 2, 4.07 g (0.01 mol) of 5-amino-8-(4-sulpho-phenylazo)-naphthalene-2-sulphonic acid and 2.23 g (0.01 mol) of 8-amino-naphthalene-2-sulphonic acid (1.7-Cleve acid) are reacted and worked-up.

UV$_{vis}$(H$_2$O) $\lambda_{max}$: 536 nm, purity (84% at 254 nm) determined by HPLC-area %, isolated yield 10%, black solid.

Example 30

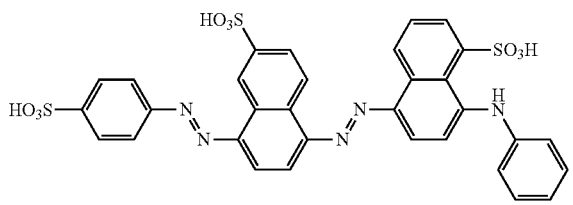 [SMILES: O=S(=O)(O)c1ccc(/N=N/c2ccc(/N=N/c3ccc(Nc4ccccc4)c4c(S(=O)(=O)O)cccc34)c3ccc(S(=O)(=O)O)cc23)cc1]

Following the general procedure described in Example 2, 4.07 g (0.01 mol) of 5-amino-8-(4-sulpho-phenylazo)-naphthalene-2-sulphonic acid and 3.0 g (0.01 mol) of 8-phenylamino-naphthalene-1-sulphonic acid (N-phenyl Peri acid) are reacted and worked-up.

UN$_{vis}$(H$_2$O) $\lambda_{max}$: 581 nm, purity (93% at 254 nm) determined by HPLC-area %, isolated yield 12%, black solid.

Example 31

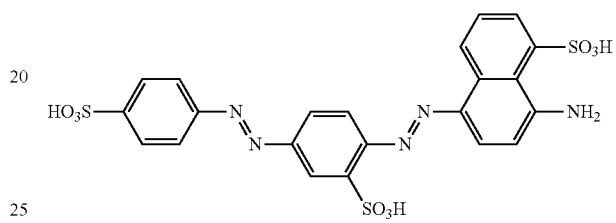

Following the general procedure described in Example 2b, 3.79 g (0.01 mol) of 4-amino-1,1'-azobenzene-3,4'-disulphonic acid, sodium salt (Acid Yellow 9) and 2.83 g (0.01 mol) of 8-amino-naphthalene-1-sulphonic acid (Peri acid) are reacted. After completing the reaction, the crude dye is isolated by adding 30% (w/w) of sodium chloride.

It is further treated with water to remove impurities and excess of sodium chloride.

UV$_{vis}$(H$_2$O) $\lambda_{max}$: 514 nm, purity (89% at 254 nm) determined by HPLC-area %, isolated yield 31%, greenish-black solid.

The structure is confirmed by ESI-LC-MS.

| Molecular weight (g/mol) | Structure |
| --- | --- |
| 592 (Side component) | |

| Molecular weight (g/mol) | Structure |
|---|---|
| 591 (Main product) | |

Example 32

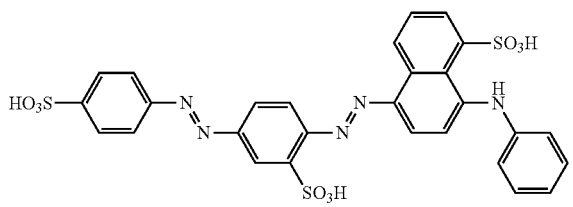 [SMILES: O=S(=O)(O)c1ccc(/N=N/c2ccc(/N=N/c3ccc(Nc4ccccc4)c4c(S(=O)(=O)O)cccc34)c(S(=O)(=O)O)c2)cc1]

Following the general procedure described in Example 2, 3.79 g (0.01 mol) of 4-amino-1,1'-azobenzene-3,4'-disulphonic acid, sodium salt (Acid Yellow 9) and 3.0 g (0.01 mol) of 8-phenylamino-naphthalene-1-sulphonic acid (N-phenyl Peri acid) are reacted. The reaction product, which is the crude dye, is isolated by adding 30% (w/w) of salt. It is further treated twice with 1:1 mixture of MeOH and water to remove impurities.

UN$_{vis}$(H$_2$O) $\lambda_{max}$: 558 nm, purity (90% at 254 nm) determined by HPLC-area %, isolated yield 42%, black solid.

The structure is confirmed by ESI-LC-MS.

| Molecular weight (g/mol) | Structure |
|---|---|
| 591 (traces) | |
| 667 (main peak) | |

Example 33

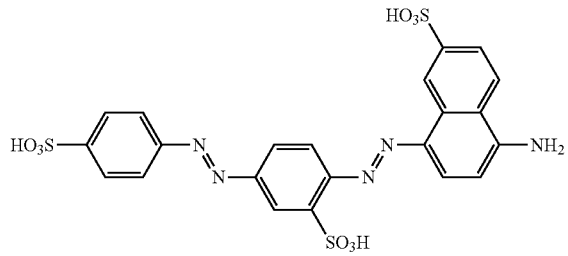 [SMILES: Nc1ccc(/N=N/c2ccc(/N=N/c3ccc(S(=O)(=O)O)cc3)cc2S(=O)(=O)O)c2cc(S(=O)(=O)O)ccc12]

Following the general procedure described in Example 2, 3.79 g (0.01 mol) of 4-amino-1,1'-azobenzene-3,4'-disulphonic acid, sodium salt (Acid Yellow 9) and 3.0 g (0.01 mol) of 5-amino-naphthalene-2-sulphonic acid (1.6-Cleve's acid) are reacted. After completing the reaction, crude dye is isolated by adding 30% (w/w) of salt. It is further treated with MeOH to remove impurities.

UN$_{vis}$(H$_2$O) $\lambda_{max}$: 507 nm, purity (84% at 254 nm) determined by HPLC-area %, isolated yield 50%, black solid.

The structure is confirmed by ESI-LC-MS.

Example 36

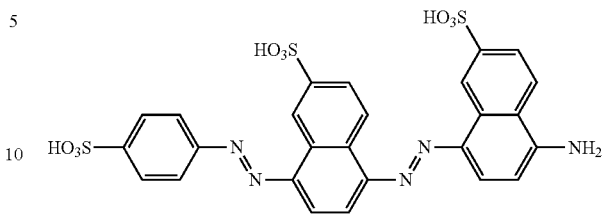

According to the procedure described in Example 28, the mono-azo derivative 5-amino-8-(4-sulphophenylazo)naphthalene-2-sulphonic acid is prepared. 4.07 g (0.01 mol) of the mono-azo and 2.23 g (0.01 mol) of 5-amino-naphthalene-2-sulphonic acid (1.6-Cleve's acid) are reacted and worked-up according to the general procedure given in Example 2b.

UV$_{vis}$(H$_2$O) $\lambda_{max}$: 539 nm, purity (86% at 254 nm) determined by HPLC-area %, isolated yield 21%, black solid.

The structure is confirmed by ESI-LC-MS.

| Molecular weight (g/mol) | Structure |
| --- | --- |
| 591 (main component) | ![structure] |
| 592 (trace) | ![structure] |

| Molecular weight (g/mol) | Structure |
|---|---|
| 641 (main component) | [structure: 4-sulfophenyl–N=N–naphthalene(SO₃H)–N=N–naphthalene(SO₃H)(NH₂)] |
| 641 | two isomers of main component detected |

The dyes prepared are summarized in the following Table 1.

TABLE 1

| Example No | Structure |
|---|---|
| 1 | [3-HO₃S-phenyl–N=N–naphthalene–N=N–naphthalene(SO₃H)(NH₂)] |
| 2 | [3-HO₃S-phenyl–N=N–naphthalene–N=N–naphthalene(SO₃H)(NH₂)] |
| 3 | [3-SO₃H-phenyl–N=N–naphthalene(SO₃H)–N=N–naphthalene(SO₃H)(NH₂)] |
| 4 | [3-SO₃H-phenyl–N=N–naphthalene(SO₃H)–N=N–naphthalene(SO₃H)(NH₂)] |

TABLE 1-continued

| Example No | Structure |
|---|---|
| 5 | *(chemical structure)* |
| 6 | *(chemical structure)* |
| 7 | *(chemical structure)* |
| 8 | *(chemical structure)* |
| 9 | *(chemical structure)* |

TABLE 1-continued

| Example No | Structure |
|---|---|
| 10 | (structure) |
| 11 | (structure) |
| 12 | (structure) |
| 13 | (structure) |
| 14 | (structure) |
| 15 | (structure) |
| 16 | (structure) |

TABLE 1-continued

| Example No | Structure |
|---|---|
| 17 | |
| 18 | |
| 19 | |
| 20 | |
| 21 | |
| 22 | |

TABLE 1-continued

| Example No | Structure |
|---|---|
| 23 | |
| 24 | |
| 25 | |
| 26 | |
| 27 | |
| 28 | |

TABLE 1-continued

| Example No | Structure |
|---|---|
| 29 | |
| 30 | |
| 31 | |
| 32 | |
| 33 | |
| 34 | |

TABLE 1-continued

| Example No | Structure |
|---|---|
| 35 | [chemical structure: SO₃H-phenyl-N=N-phenyl(SO₃H)-N=N-naphthyl(SO₃H)(NH₂)] |
| 36 | [chemical structure: HO₃S-phenyl-N=N-naphthyl(HO₃S)-N=N-naphthyl(HO₃S)(NH₂)] |

The sulphonic acid groups in the above formulae are given in their free acid form. Equally embraced are the corresponding Na and K salts which may also be formed at the appropriate pH values.

B. APPLICATION EXAMPLES

Washing Experiments

Bleached cotton is washed for 15 minutes at 30° C. with a detergent containing the shading dye, with or without the addition of a blend of photo catalysts, compound 101 and 102, as described on page 10. The amount of detergent applied is 40 g per kg fabric, the fabric to water ratio is 1 to 10.

After washing the samples are dried under light exposure (Tungsten light bulb, 200 W) for one hour. Blank tests are done by drying the samples without light exposure. This washing/drying cycle is repeated five times in order to obtain a concentration profile of the shading dye/photo catalyst in domestic laundry conditions.

After running the fifth cycle the relative amount of dye on the fabric dried in the dark and on the fabric dried under exposure is determined from reflectance measurements of an optically opaque pilling. By using the Kubelka-Munk equation (1), the K/S values and the relative dye concentration after irradiation is determined. In the table below the % concentration of dye after irradiation with/without photo catalyst is shown.

$$\frac{K}{S} = \frac{(1-R)^2}{2R} \quad (1)$$

TABLE 2

% Dye photodegradation after 1 Wash/dry Cycle

| Dye | % Dye in Detergent | % Photo Catalyst in Detergent | % Dye Photodegradation |
|---|---|---|---|
| 1 | 0.005 | 0.00 | 10 |
|   | 0.005 | 0.04 | 55 |
| 2 | 0.02 | 0.00 | 6 |
|   | 0.02 | 0.10 | 33 |
| 3 | 0.02 | 0.00 | 17 |
|   | 0.02 | 0.04 | 56 |
| 4 | 0.02 | 0.00 | 22 |
|   | 0.02 | 0.10 | 55 |
| 6 | 0.02 | 0.00 | 13 |
|   | 0.02 | 0.04 | 52 |
| 7 | 0.02 | 0.00 | 12 |
|   | 0.02 | 0.04 | 38 |
| 8 | 0.02 | 0.00 | 4 |
|   | 0.02 | 0.04 | 16 |
| 10 | 0.01 | 0.00 | 8 |
|    | 0.01 | 0.02 | 33 |
| 11 | 0.01 | 0.00 | 13 |
|    | 0.01 | 0.06 | 47 |
| 12 | 0.01 | 0.00 | 19 |
|    | 0.01 | 0.05 | 39 |
| 14 | 0.02 | 0.00 | 6 |
|    | 0.02 | 0.04 | 30 |
| 15 | 0.01 | 0.00 | 4 |
|    | 0.01 | 0.03 | 57 |
| 16 | 0.04 | 0.00 | 5 |
|    | 0.04 | 0.08 | 47 |
| 17 | 0.01 | 0.00 | 6 |
|    | 0.01 | 0.02 | 31 |
| 18 | 0.008 | 0.00 | 4 |
|    | 0.008 | 0.04 | 19 |

TABLE 3

| | Dye Photodegradation after 1 and 5 Wash/dry Cycles | | | |
|---|---|---|---|---|
| Dye | % Dye in Detergent | % Photo Catalyst in Detergent | Relative Dye Concentration After 1 Wash/dry cycle | Relative Dye Concentration After 5 Wash/dry cycles |
| 1 | 0.01 | 0.00 | 1.00 | 3.51 |
|   | 0.01 | 0.02 | 0.56 | 0.56 |
| 3 | 0.01 | 0.00 | 1.00 | 4.09 |
|   | 0.01 | 0.01 | 0.12 | 0.97 |
| 4 | 0.02 | 0.00 | 1.00 | 4.05 |
|   | 0.02 | 0.10 | 0.69 | 1.27 |
| 6 | 0.02 | 0.00 | 1.00 | 3.77 |
|   | 0.02 | 0.04 | 0.70 | 1.28 |
| 12 | 0.01 | 0.00 | 1.00 | 4.17 |
|   | 0.01 | 0.05 | 0.64 | 1.52 |
| 14 | 0.02 | 0.00 | 1.00 | 4.17 |
|   | 0.02 | 0.04 | 0.64 | 1.52 |

The results clearly indicate a higher degradation of the bis-azo-dyes in the presence of the photo catalyst.

The values in Table 2, show that the dye concentration remains low when photo catalyst is present on the substrate preventing a build-up.

The invention claimed is:

1. A shading process for textile fabrics or fibres which process comprises applying a bis-azo-dye of formulae (I), (II) or (III) to the fabric or fibre in a laundry process

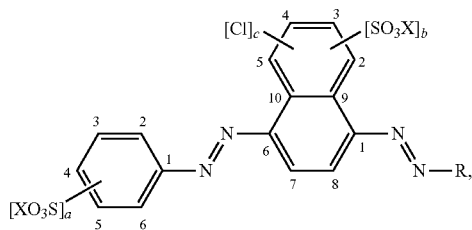

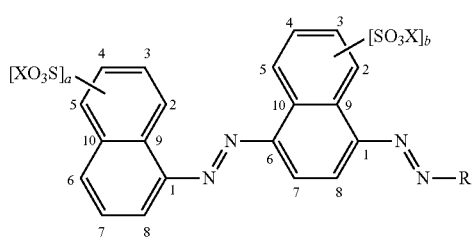

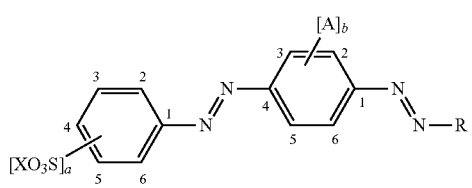

wherein
a is 0, 1 or 2;
b is 0 or 1;
c is 0 or 1;
d is 0 or 1;
A is $CH_3$ or $SO_3X$
X is H, Na or K and
R is a group

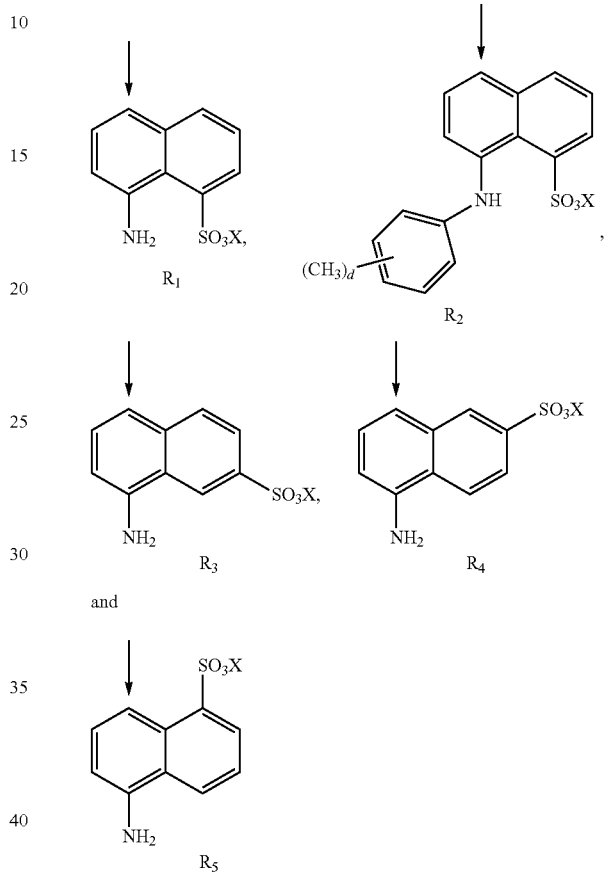

wherein the arrows indicates the points of attachment;
with the proviso that in formula (I) R is other than the group $R_2$ if a is 1 and b is 0.

2. A shading process for textile fabrics or fibres which process comprises applying a photocatalyst which is a water-soluble phthalocyanine of Zn, Fe(II), Ca, Mg, Na, K, Al, Si(IV), P(V), Ti(IV), Ge(IV), Cr(VI), Ga(III), Zr(IV), In(III), Sn(IV) or Hf(VI) and a bis-azo-dye of formulae (I), (II) or (III) to the fabric or fibre in a laundry process

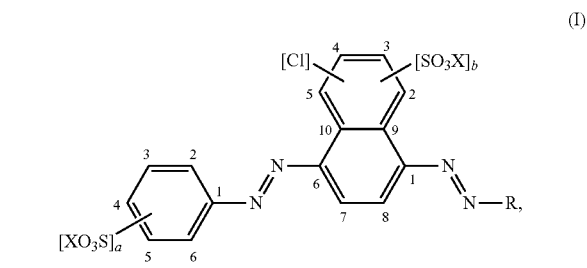

-continued
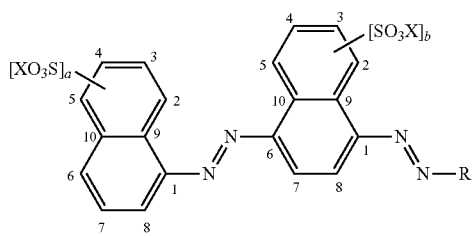
(II)
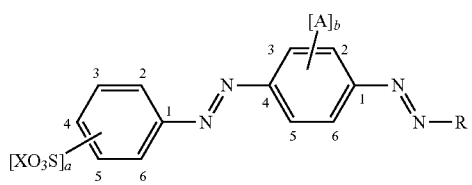
(III)
wherein
a is 0, 1 or 2;
b is 0 or 1;
c is 0 or 1;
d is 0 or 1;
A is CH$_3$ or SO$_3$X
X is H, Na or K and
R is a group
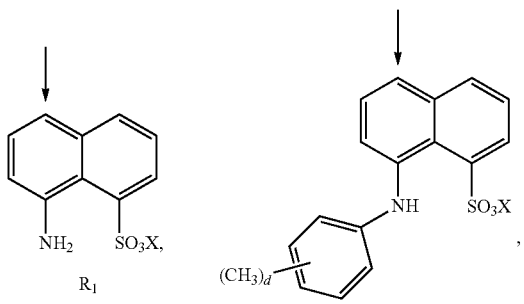
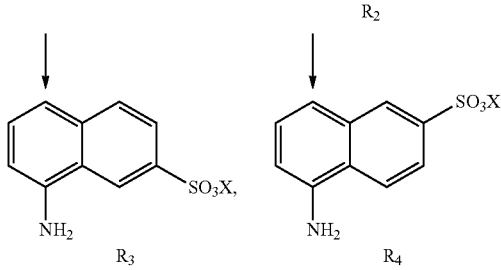
and
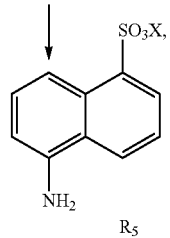
wherein the arrows indicates the points of attachment.
3. A shading process according to claim 1 wherein the bis-azo-dye is selected from the group consisting of
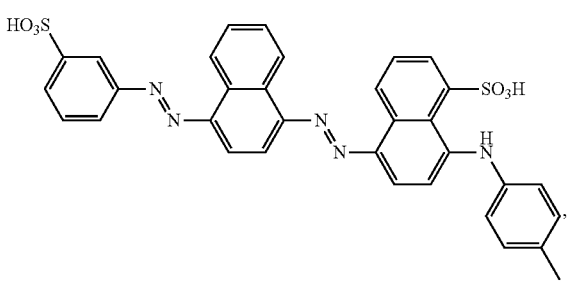
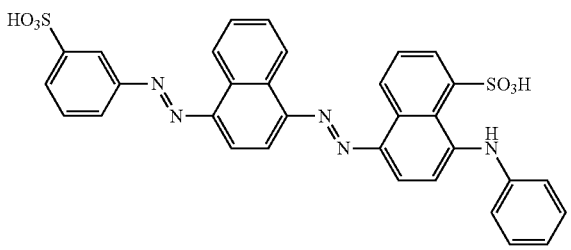
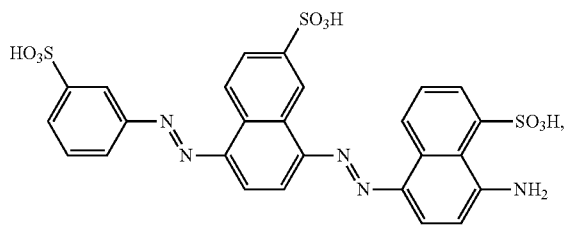
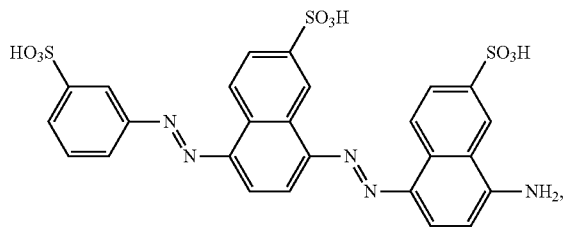
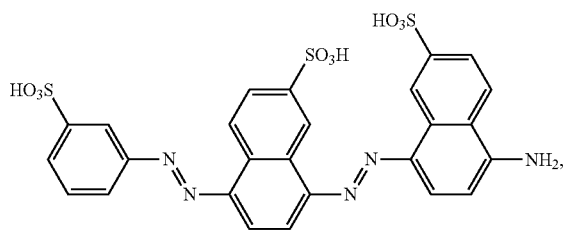

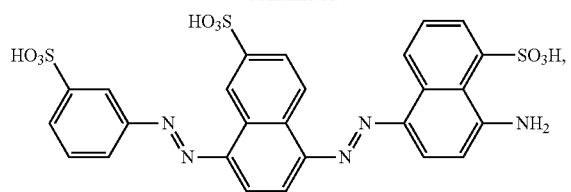

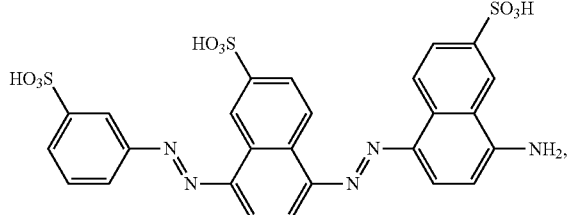

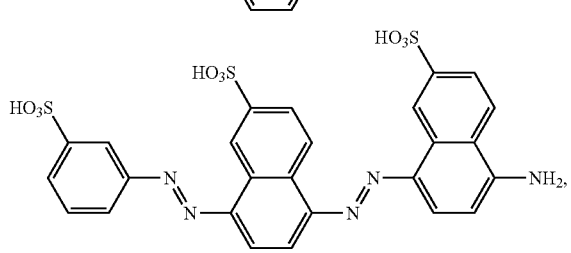

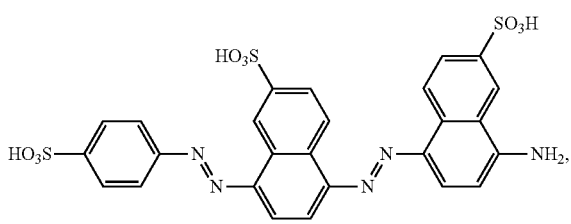

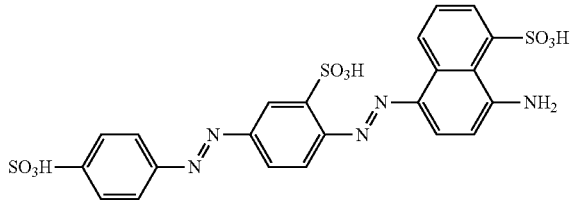

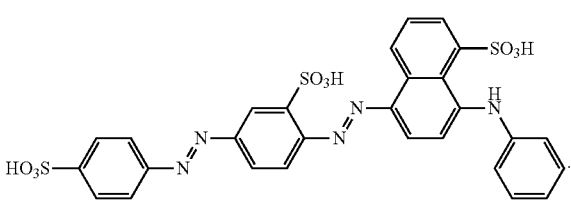

and

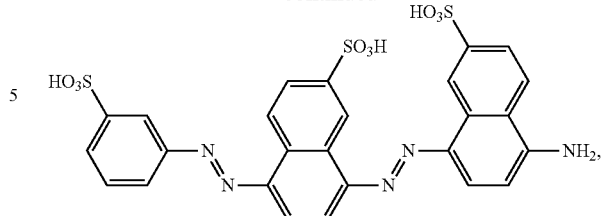

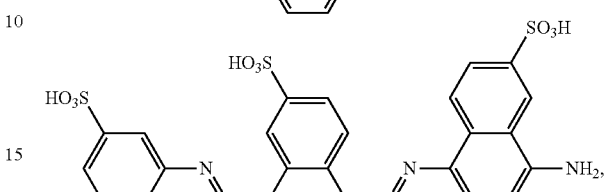

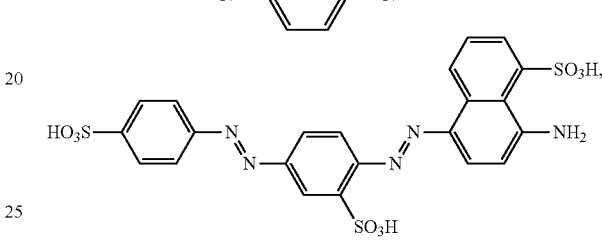

and

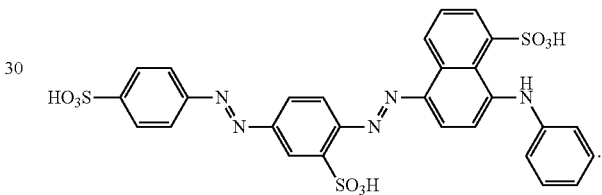

5. A shading process according to claim 2 wherein the photocatalyst is a water-soluble phthalocyanine of formula (X)

$$[Me]_q[-PC(-Q_2)]_r \qquad (X)$$

in which

PC is the phthalocyanine ring system;

Me is Zn; Fe(II); Ca; Mg; Na; K; Al—$Z_1$; Si(IV); P(V); Ti(IV); Ge(IV); Cr(VI); Ga(III); Zr(IV); In(III); Sn(IV) or Hf(VI);

$Z_1$ is the halide; sulphate; nitrate; carboxylate or alkanolate ion; or hydroxy;

q is 0; 1 or 2;

r is 1 to 8;

$Q_2$ is hydroxy; $C_1$-$C_{22}$alkyl; branched $C_3$-$C_{22}$alkyl; $C_2$-$C_{22}$alkenyl; branched $C_3$-$C_{22}$alkenyl and mixtures thereof; $C_1$-$C_{22}$alkoxy; a sulpho or carboxy radical; a radical of the formula

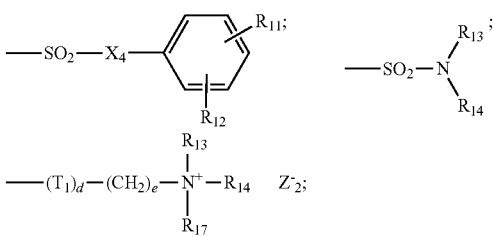

4. The shading process according to claim 1, wherein the bis-azo-dye is selected from the group consisting of

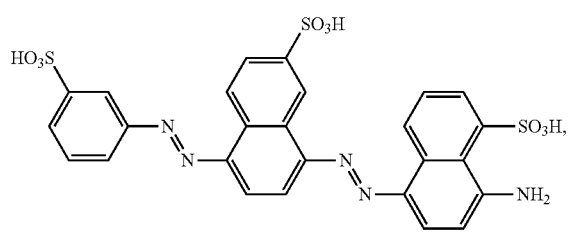

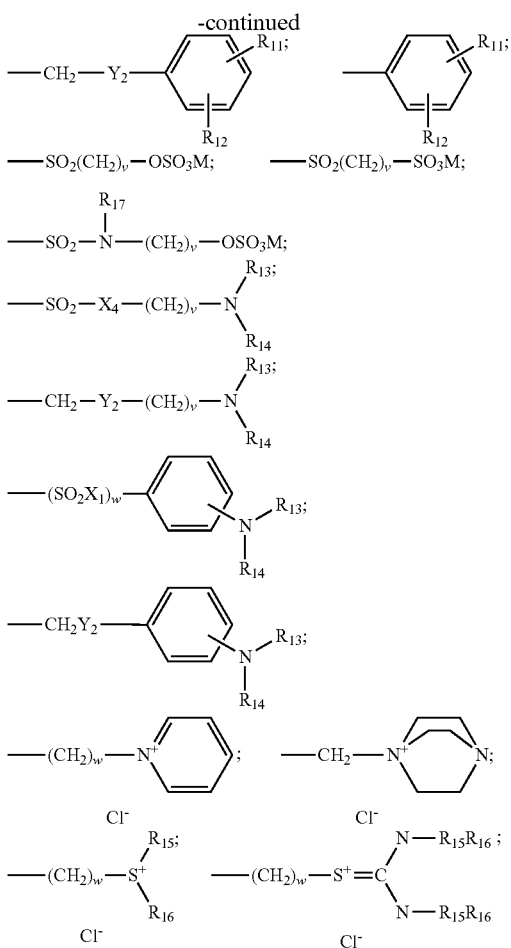

a branched alkoxy radical of the formula

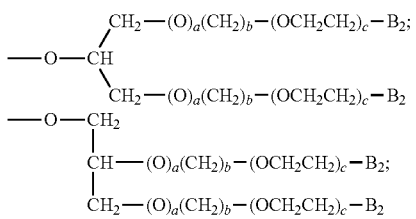

an alkylethyleneoxy unit of the formula
-(T$_1$)$_d$-(CH$_2$)$_b$(OCH$_2$CH$_2$)$_a$—B$_3$ or an ester of the formula COOR18
in which
B$_2$ is hydrogen; hydroxy; C$_1$-C$_{30}$alkyl; C$_1$-C$_{30}$alkoxy; —CO$_2$H; —CH$_2$COOH; —SO$_3$M$_1$; —OSO$_3$$^-$M$_1$; —PO$_3$$^{2-}$M$_1$; —OPO$_3$$^{2-}$M$_1$; and mixtures thereof;
B$_3$ is hydrogen; hydroxy; —COOH; —SO$_3$$^-$M$_1$; —OSO$_3$$^-$M$_1$ or C$_1$-C$_6$alkoxy;
M$_1$ is a water-soluble cation;
T$_1$ is —O—; or —NH—;
X$_1$ and X$_4$ independently of one another are —O—; —NH— or —N—C$_1$-C$_5$alkyl;

R$_{11}$ and R$_{12}$ independently of one another are hydrogen; a sulpho group and salts thereof; a carboxy group and salts thereof or a hydroxy group; at least one of the radicals R$_{11}$ and R$_{12}$ being a sulpho or carboxy group or salts thereof, Y$_2$ is —O—; —S—; —NH— or —N—C$_1$-C$_5$alkyl;

R$_{13}$ and R$_{14}$ independently of one another are hydrogen; C$_1$-C$_6$alkyl; hydroxy-C$_1$-C$_6$alkyl; cyano-C$_1$-C$_6$alkyl; sulpho-C$_1$-C$_6$alkyl; carboxy or halogen-C$_1$-C$_6$alkyl; unsubstituted phenyl or phenyl substituted by halogen, C$_1$-C$_4$alkyl or C$_1$-C$_4$alkoxy; sulpho or carboxy or R$_{13}$ and R$_{14}$ together with the nitrogen atom to which they are bonded form a saturated 5- or 6-membered heterocyclic ring which may additionally also contain a nitrogen or oxygen atom as a ring member;

R$_{15}$ and R$_{16}$ independently of one another are C$_1$-C$_6$alkyl or aryl-C$_1$-C$_6$alkyl radicals;

R$_{17}$ is hydrogen; unsubstituted C$_1$-C$_6$alkyl or C$_1$-C$_6$alkyl substituted by halogen, hydroxy, cyano, phenyl, oarboxy, carb-C$_1$-C$_6$alkoxy or C$_1$-C$_6$alkoxy;

R$_{18}$ is C$_1$-C$_{22}$alkyl; branched C$_3$-C$_{22}$alkyl; C$_1$-C$_{22}$alkenyl or branched C$_3$-C$_{22}$alkenyl; C$_3$-C$_{22}$glycol; C$_1$-C$_{22}$alkoxy; branched C$_3$-C$_{22}$alkoxy; and mixtures thereof;

M is hydrogen; or an alkali metal ion or ammonium ion,

Z$_2$$^-$ is a chlorine; bromine; alkylsulphate or aralkylsulphate ion;

a is 0 or 1;

b is from 0 to 6;

c is from 0 to 100;

d is 0; or 1;

e is from 0 to 22;

v is an integer from 2 to 12;

w is 0 or 1; and and where the phthalocyanine ring system may also comprise further solubilising groups.

6. A shading process according to claim 2, wherein the photocatalyst is a water-soluble phthalocyanine of formulae

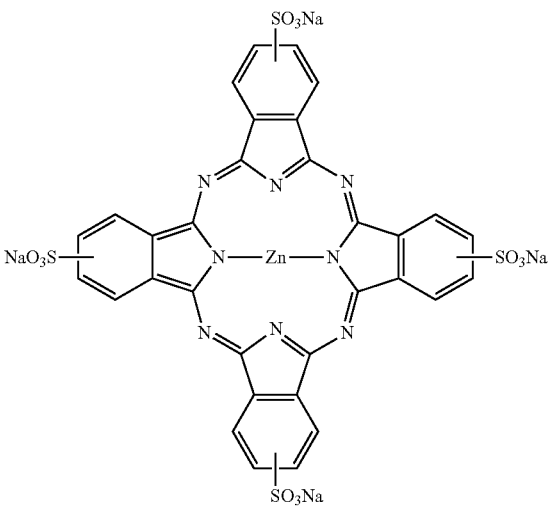

or

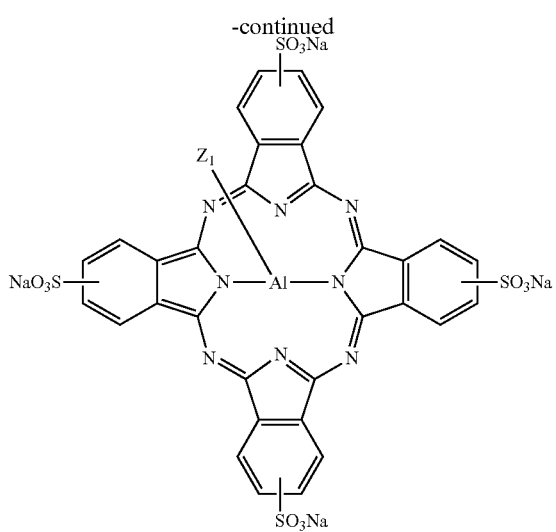

or a mixture thereof, wherein the degree of sulphonation is 2-4 and $Z_1$ is a halide, sulphate, nitrate, carboxylate, or alkanolate ion or hydroxy.

7. A shading process according to claim 1, wherein at least one fluorescent whitening agent is comprised.

8. A composition comprising
a) A bis-azo-dye of formulae (I), (II) or (III)

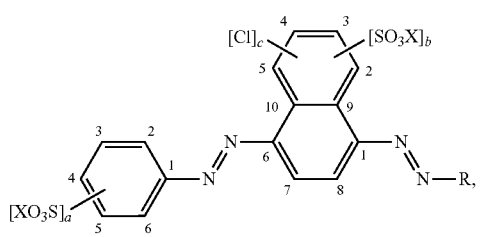

(I)

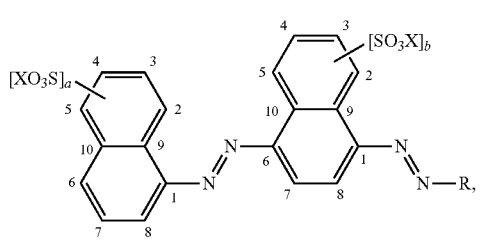

(II)

or

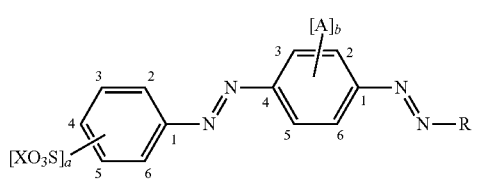

(III)

wherein
a is 0, 1 or 2;
b is 0 or 1;
c is 0 or 1;
d is 0 or 1;
A is $CH_3$ or $SO_3X$ X is H, Na or K and
R is a group

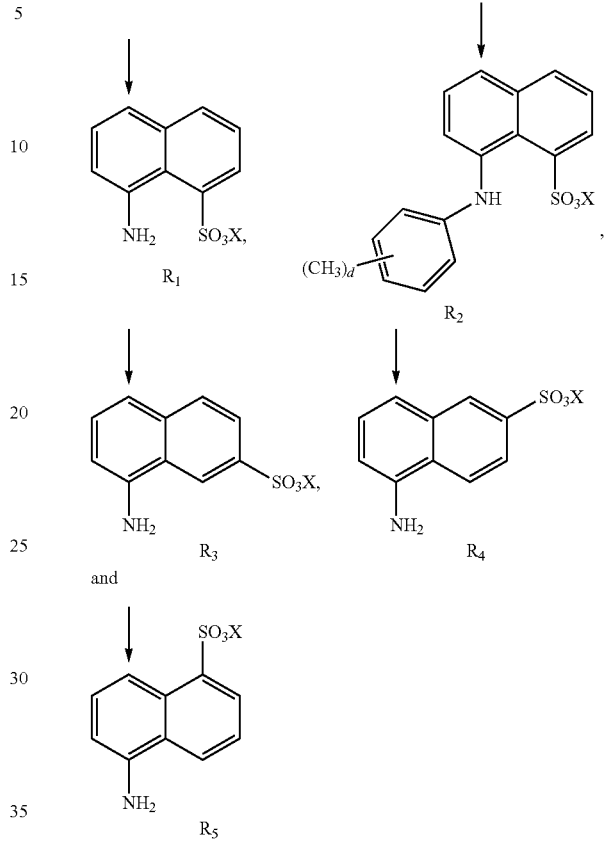

and wherein the arrows indicate the points of attachment, and
b) A water-soluble phthalocyanine of Zn, Fe(II), Ca, Mg, Na, K, Al, Si(IV), P(V), Ti(IV), Ge(IV), Cr(VI), Ga(III), Zr(IV), In(III), Sn(IV) or Hf(VI).

9. A granular formulation comprising
a) From 2 to 75 wt-% of a composition as defined in claim 8, based on the total weight of the granulate,
b) From 10 to 95 wt-% of at least one further additive, based on the total weight of the granulate, and
c) From 0 to 15 wt-% water, based on the total weight of the granulate.

10. A liquid formulation comprising a composition according to claim 8.

11. A detergent formulation comprising
I) From 5 to 70 wt-% A) of at least one anionic surfactant and/or B) at least one non-ionic surfactant, based on the total weight of the washing agent formulation,
II) From 5 to 60 wt-% C) of at least one builder substance, based on the total weight of the washing agent formulation,
III) From 0 to 30 wt-% D) of at least one peroxide and, optionally, at least one activator, based on the total weight of the washing agent formulation, and
IV) From 0.001 to 1 wt-% E) of at least one granulate which contains
a) From 2 to 75 wt-% of a composition as defined in claim 8, based on the total weight of the granulate,
b) From 10 to 95 wt-% of at least one further additive, based on the total weight of the granulate, and c) From 0 to 15 wt-% water, based on the total weight of the granulate, V) From 0 to 60 wt-% F) of at least one further additive, and VI) From 0 to 5 wt-% G) water.

12. A liquid or solid detergent formulation in which the composition as defined in claim 8 is homogeneously distributed.

13. A method of improving the whiteness of textile materials by adding thereto a bis-azo-dye as defined in claim 1.

14. A method of improving the whiteness of textile materials by adding thereto a composition as defined in claim 8.

15. A bis-azo-dye selected from the group consisting of the following compounds of examples (2)

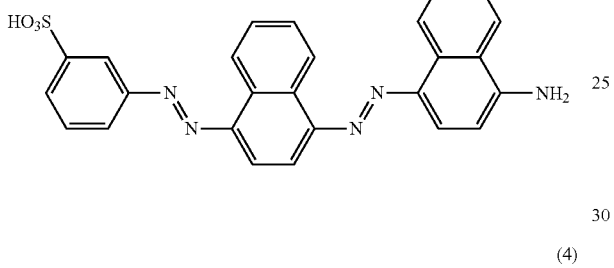

(4)

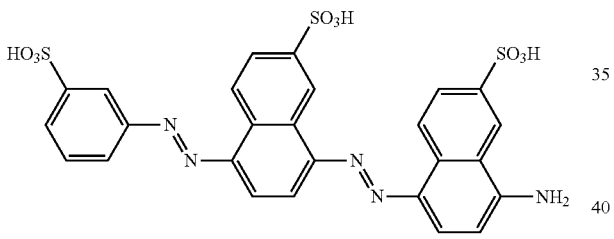

(5)

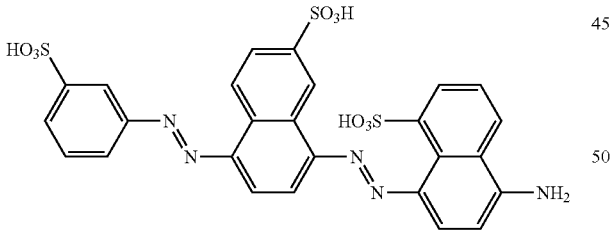

(6)

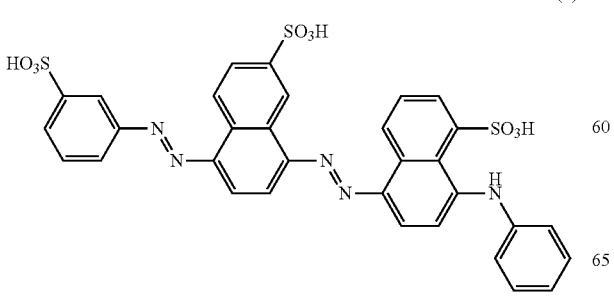

-continued (7)

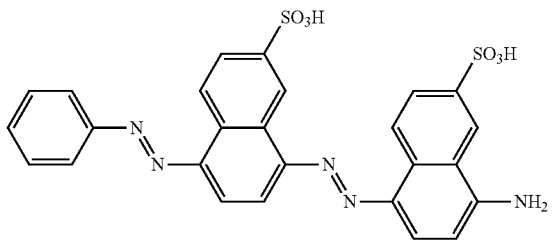 [SMILES: Nc1ccc(/N=N/c2ccc(/N=N/c3ccccc3)c3ccc(S(=O)(=O)O)cc23)c2ccc(S(=O)(=O)O)cc12]

(9)

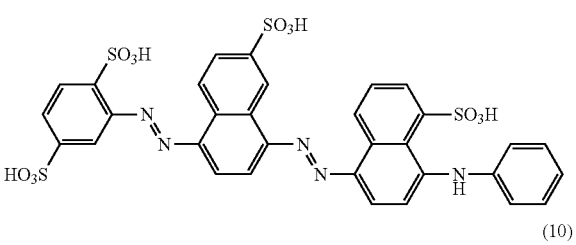

(10)

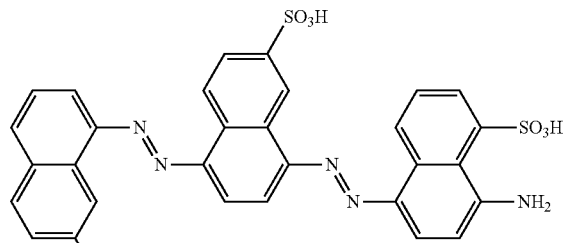

(11)

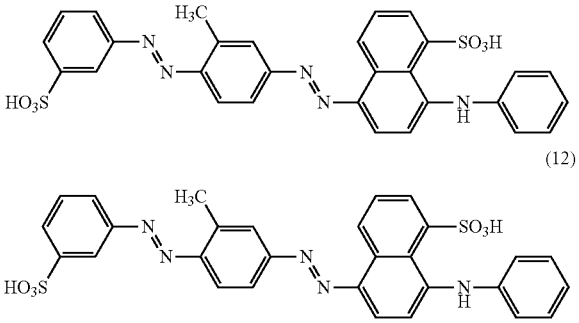

(12)

(13)

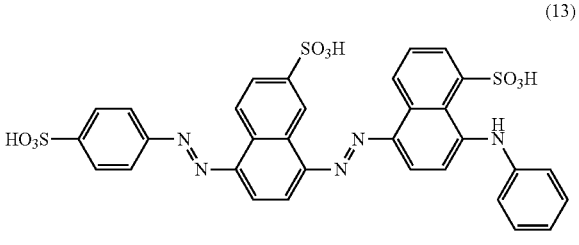

(15)

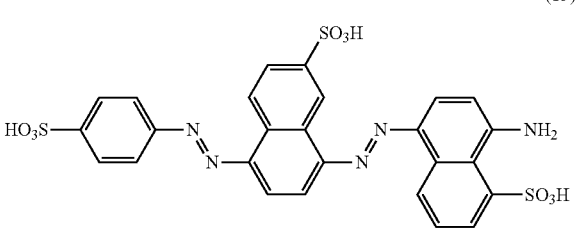

(16)
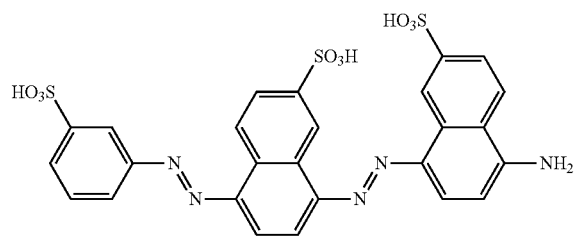 [SMILES: Nc1ccc(/N=N/c2ccc(/N=N/c3cccc(S(=O)(=O)O)c3)c3ccc(S(=O)(=O)O)cc23)c2cc(S(=O)(=O)O)ccc12]
(18)
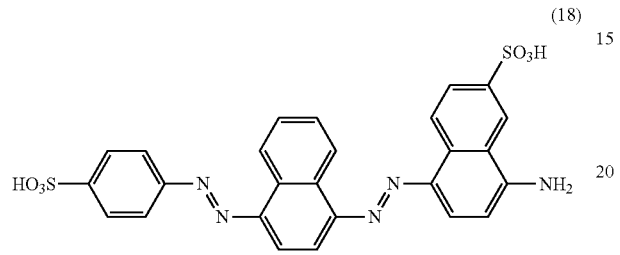
(20)
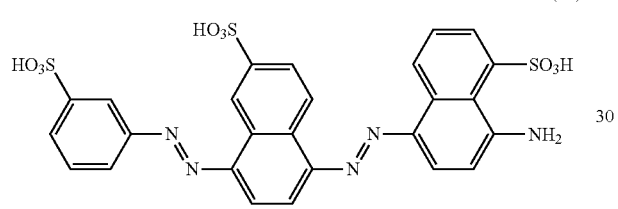
(21)
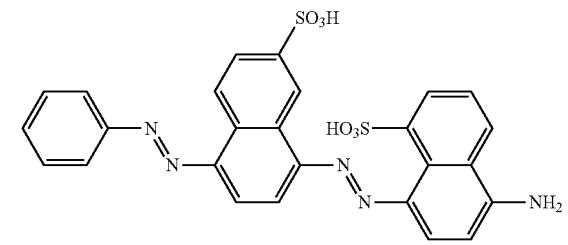 [SMILES: Nc1ccc(/N=N/c2ccc(/N=N/c3ccccc3)c3ccc(S(=O)(=O)O)cc23)c2c(S(=O)(=O)O)cccc12]
(22)
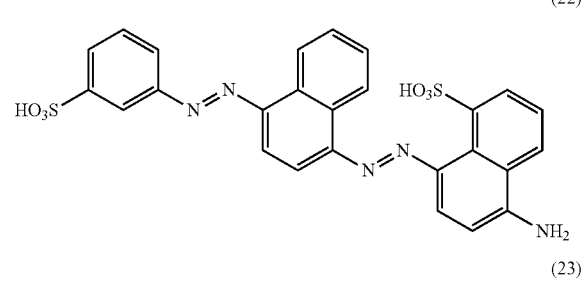
(23)
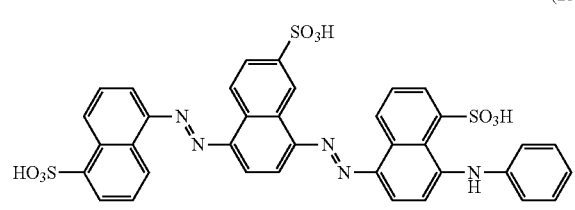
(24)
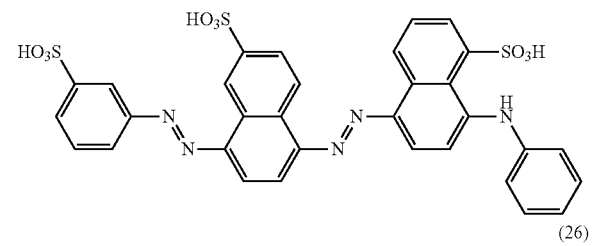
(26)
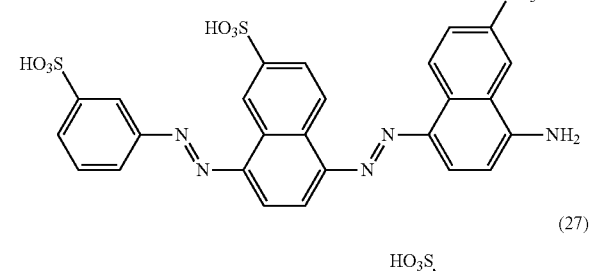
(27)
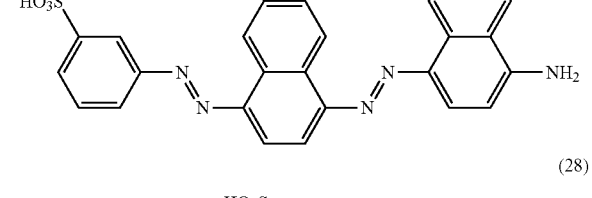
(28)
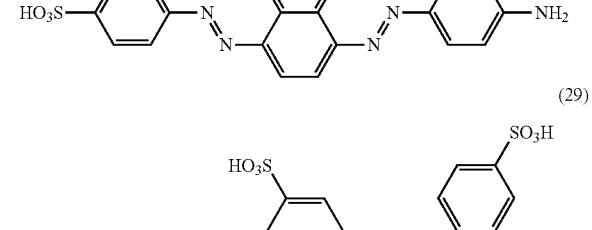
(29)
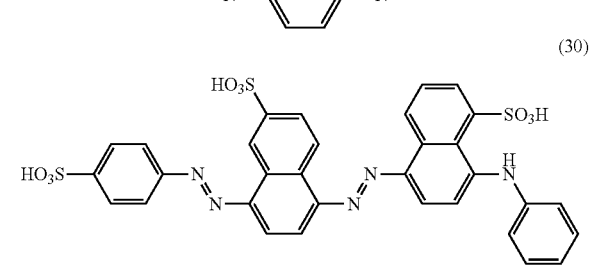
(30)
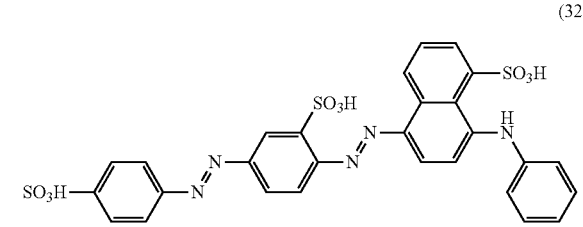
(32)

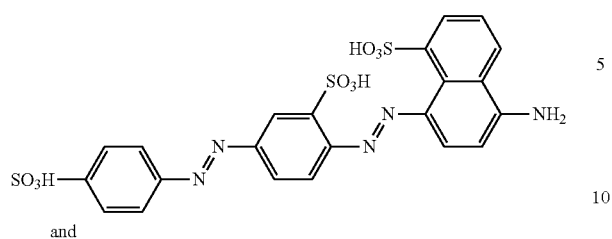
(34)
and
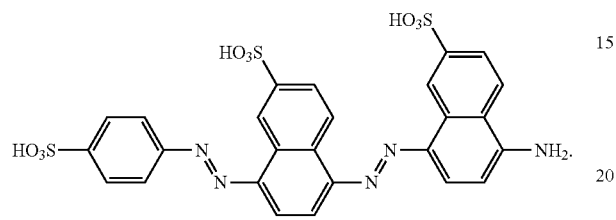
(36)
* * * * *